United States Patent
Dai

(10) Patent No.: US 10,503,758 B2
(45) Date of Patent: Dec. 10, 2019

(54) INFORMATION PROCESSING APPARATUS USING HIERARCHICAL TAGS FOR STREAMLINING THE PRESENTATION OF INFORMATION AND NON-TRANSITORY COMPUTER READABLE MEDIUM FOR THE SAME

(71) Applicant: FUJI XEROX CO., LTD., Tokyo (JP)

(72) Inventor: Jiahao Dai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 150 days.

(21) Appl. No.: 15/596,487

(22) Filed: May 16, 2017

(65) Prior Publication Data

US 2018/0060413 A1    Mar. 1, 2018

(30) Foreign Application Priority Data

Sep. 1, 2016   (JP) .................. 2016-170839

(51) Int. Cl.
*G06F 16/28* (2019.01)
*G06F 16/248* (2019.01)
*G06F 16/2457* (2019.01)
*G06F 16/906* (2019.01)
*G06F 16/335* (2019.01)
*G06Q 10/10* (2012.01)

(52) U.S. Cl.
CPC .......... *G06F 16/285* (2019.01); *G06F 16/248* (2019.01); *G06F 16/24573* (2019.01); *G06F 16/335* (2019.01); *G06F 16/906* (2019.01); *G06Q 10/10* (2013.01)

(58) Field of Classification Search
CPC ............. G06F 17/30699; G06F 16/285; G06F 16/906; G06F 16/335; H04L 67/306
See application file for complete search history.

(56) References Cited

U.S. PATENT DOCUMENTS

| | | | |
|---|---|---|---|
| 6,704,729 B1* | 3/2004 | Klein ................ | G06F 17/30696 |
| 9,576,030 B1* | 2/2017 | Kapczynski .......... | G06F 16/285 |
| 2008/0104495 A1* | 5/2008 | Craig .................... | H04L 67/306 |
| | | | 715/205 |
| 2010/0169798 A1* | 7/2010 | Hyndman ............... | G06F 3/011 |
| | | | 715/757 |
| 2012/0038670 A1* | 2/2012 | Choi ..................... | G06T 19/006 |
| | | | 345/633 |
| 2012/0144316 A1* | 6/2012 | Deng .................... | G06Q 30/02 |
| | | | 715/751 |
| 2013/0297593 A1* | 11/2013 | Jain ....................... | G06Q 50/01 |
| | | | 707/722 |
| 2014/0067826 A1* | 3/2014 | Jackson ................. | G06Q 50/01 |
| | | | 707/748 |
| 2014/0280152 A1* | 9/2014 | Jin ......................... | G06Q 10/10 |
| | | | 707/737 |
| 2015/0278339 A1* | 10/2015 | Cherukuri ............ | G06F 16/285 |
| | | | 707/738 |

FOREIGN PATENT DOCUMENTS

| | | |
|---|---|---|
| JP | 2010-026996 A | 2/2010 |
| JP | 2014-142689 A | 8/2014 |

* cited by examiner

*Primary Examiner* — Charles E Lu
(74) *Attorney, Agent, or Firm* — Oliff PLC

(57) ABSTRACT

An information processing apparatus includes a presentation unit that, when each user is assigned at least one tag indicating characteristics of the user and a tag is in common between a viewing user and a viewed user, presents the tag in common of the viewing user in more detail than a tag which is not in common.

9 Claims, 20 Drawing Sheets

FIG. 3

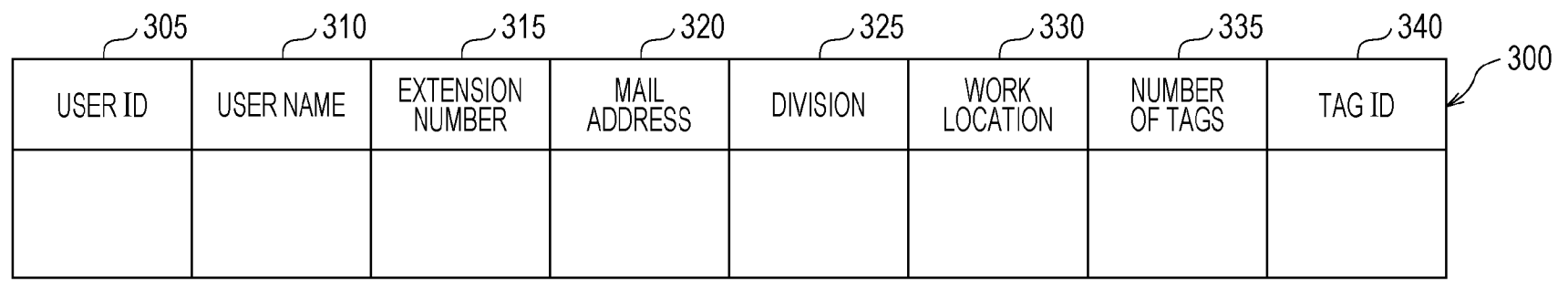

| 305 | 310 | 315 | 320 | 325 | 330 | 335 | 340 |
|---|---|---|---|---|---|---|---|
| USER ID | USER NAME | EXTENSION NUMBER | MAIL ADDRESS | DIVISION | WORK LOCATION | NUMBER OF TAGS | TAG ID |
| | | | | | | | |

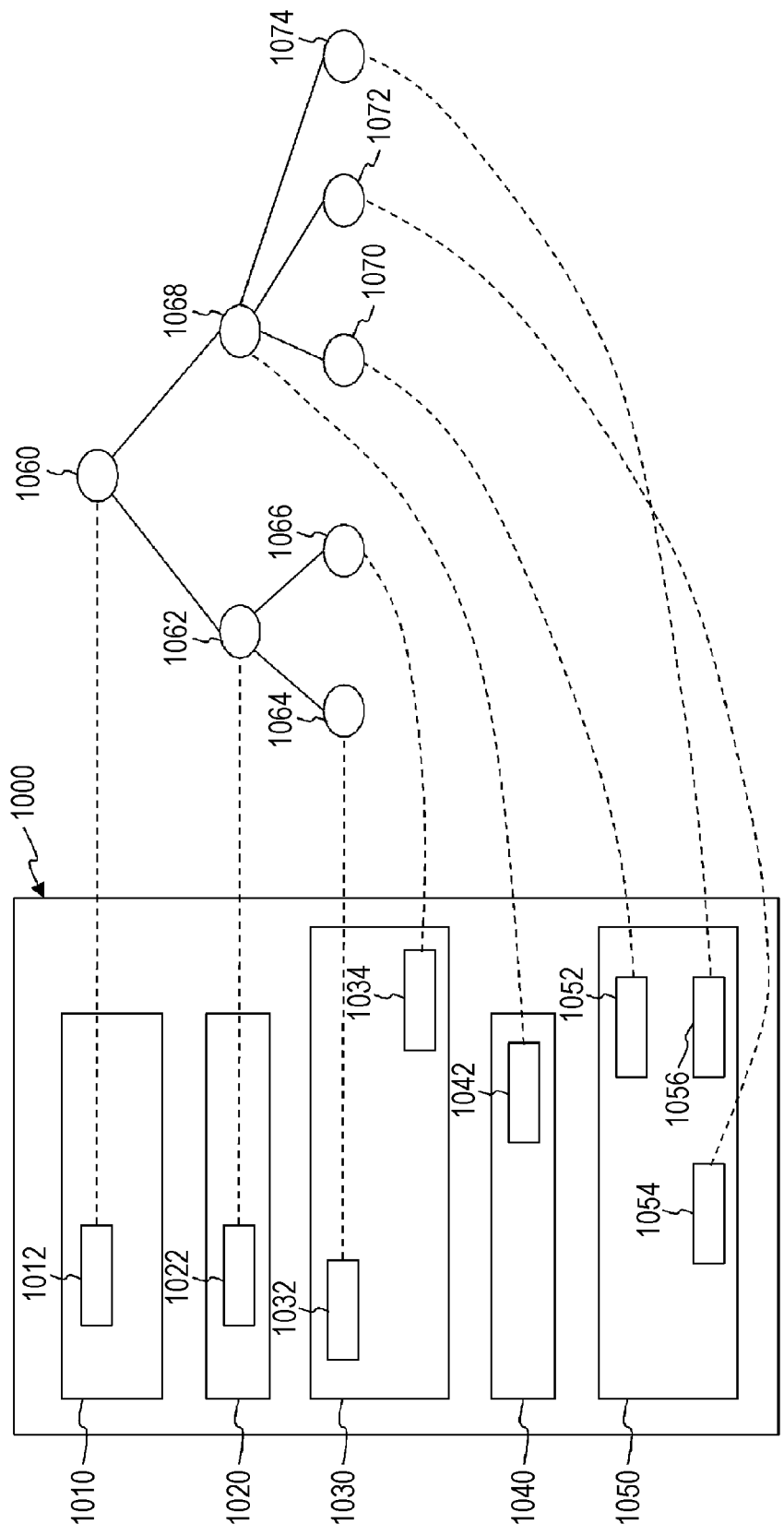

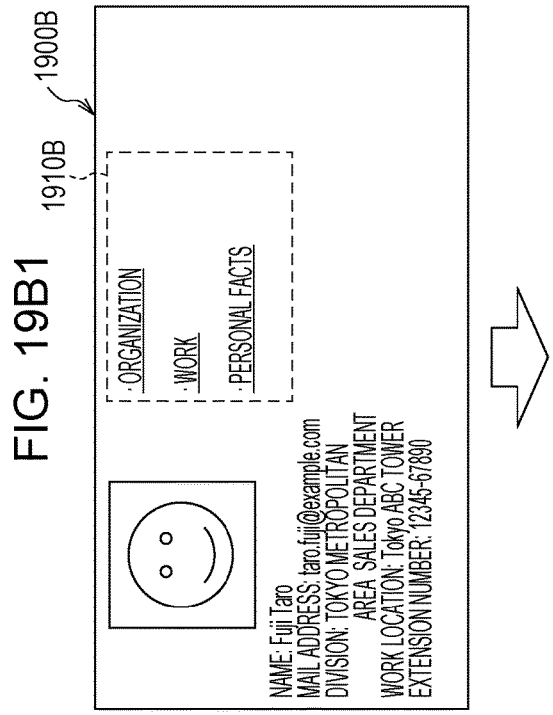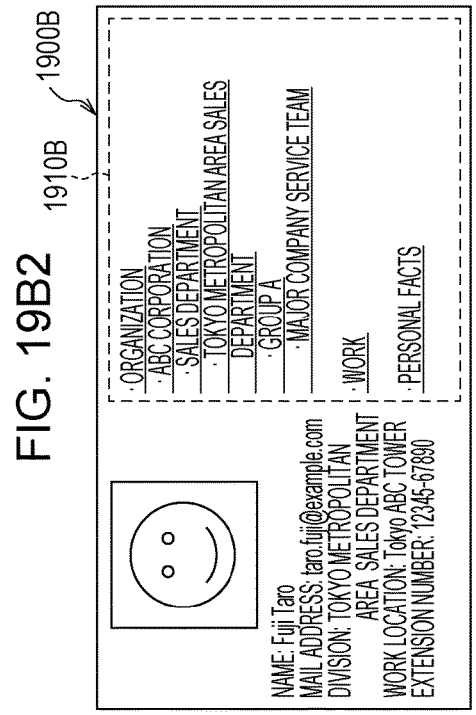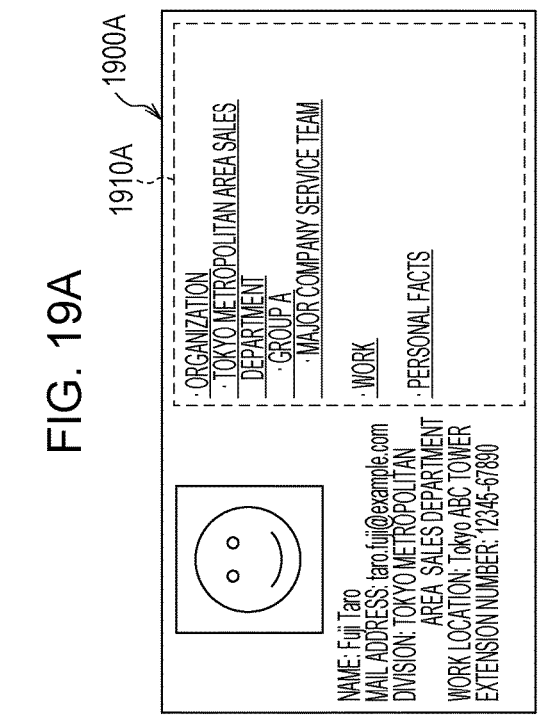

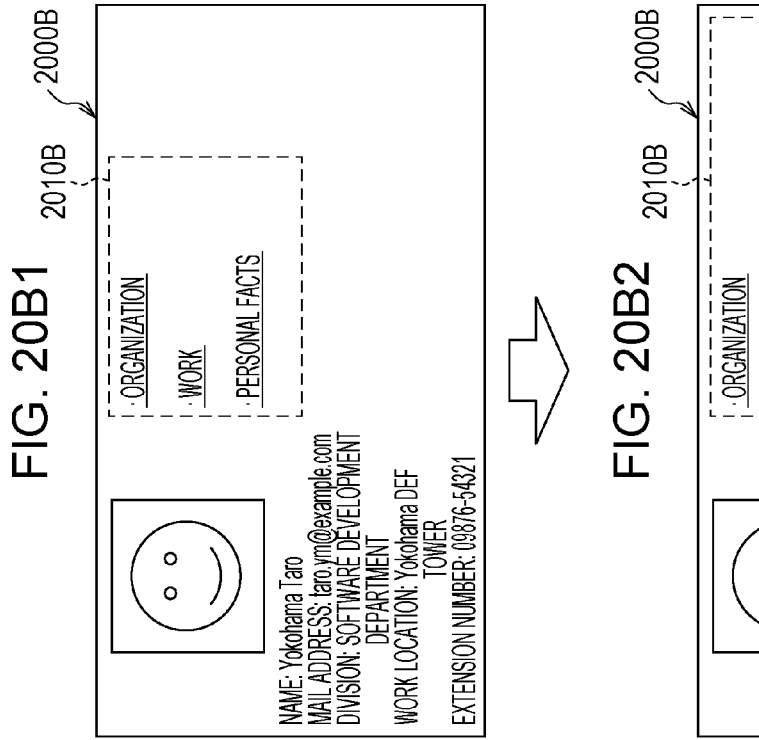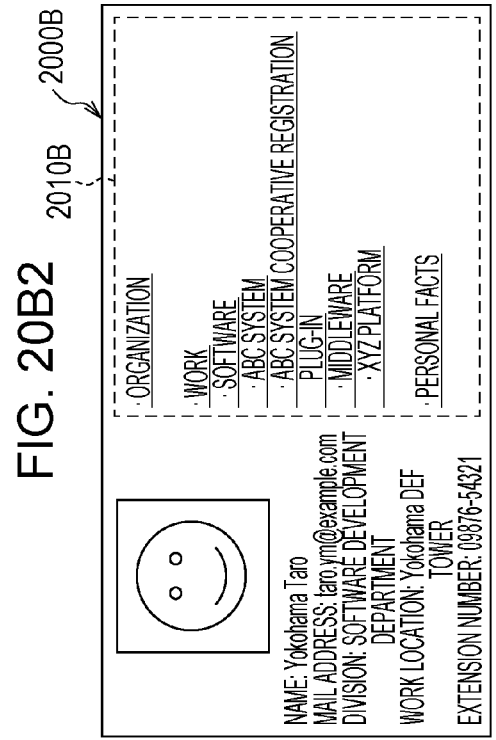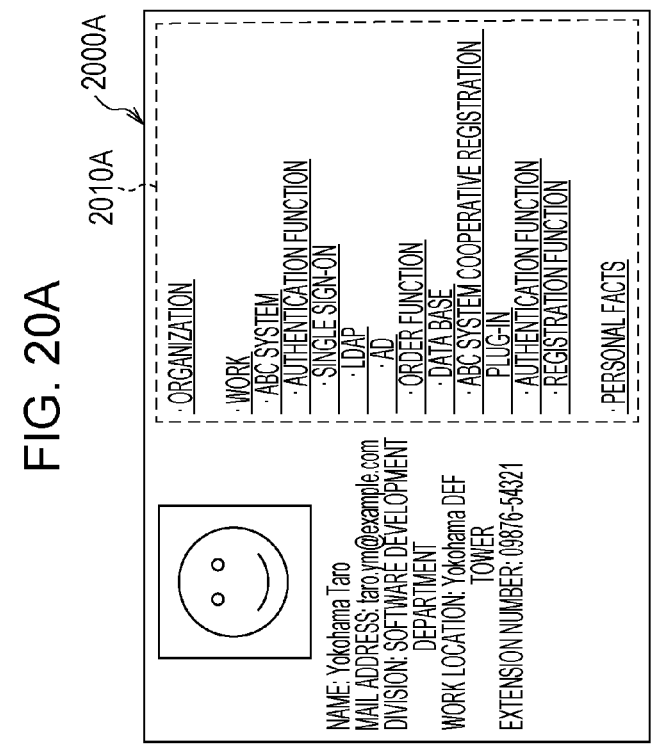

INFORMATION PROCESSING APPARATUS USING HIERARCHICAL TAGS FOR STREAMLINING THE PRESENTATION OF INFORMATION AND NON-TRANSITORY COMPUTER READABLE MEDIUM FOR THE SAME

CROSS-REFERENCE TO RELATED APPLICATIONS

This application is based on and claims priority under 35 USC 119 from Japanese Patent Application No. 2016-170839 filed Sep. 1, 2016.

BACKGROUND

Technical Field

The present invention relates to an information processing apparatus and a non-trans computer readable medium.

SUMMARY

According to an aspect of the invention, there provided an information processing apparatus including a presentation unit that, when each user is assigned at least one tag indicating characteristics of the user and a tag is in common between a viewing user and a viewed user, presents the tag in common of the viewing user in more detail than a tag which is not in common.

BRIEF DESCRIPTION OF THE DRAWINGS

Exemplary embodiment of the present invention will be described in detail based on the following figures, wherein:

FIG. 3 is an explanatory table illustrating a data structure example of a profile table;

FIGS. 10A and 10B are explanatory diagrams illustrating a hierarchical structure example of a work tag;

FIGS. 19A to 19B2 are explanatory diagrams illustrating a processing example according to this exemplary embodiment;

FIGS. 20A to 20B2 are explanatory diagrams illustrating a processing example according to this exemplary embodiment;

DETAILED DESCRIPTION

Exemplary embodiments of the present invention will be described in detail based on the following figures, wherein:

DETAILED DESCRIPTION

First, before describing this exemplary embodiment, the precondition and an information processing apparatus utilizing this exemplary embodiment will be described. It is to be noted that the description is intended to facilitate the understanding of this exemplary embodiment.

Display of profiles in, such as SNS has "tag function" that allows characteristics (for instance, expertise) of a user to be registered with a word. In addition, a function may be provided to highlight a tag which is attached by another user. The expertise of users may be viewed at a glance by the tag function. Also, objective evaluation may be obtained by tagging from other users. As a tendency, tags added to users increase in number.

However, in related art, only a method of searching with a specific keyword or of checking the tags sequentially from the top is provided to a viewing user. When the tags added by a user and the tags added by other users increase in number, the screen looks complicated, and it is difficult to obtain desired information.

When tagging is manually done by a user (including a user himself or herself and other users) for a tag related to organization or work with objectivity, the tagging varies with individuals, and thus duplication, oversight, or a difference in level of feeling occurs. When there is a possibility that oversight or exaggeration in the tags may occur, sufficient reliability is not fulfilled.

Hereinafter, an example of an exemplary embodiment in order to implement the present invention based on the drawings will be described.

Figure 1:
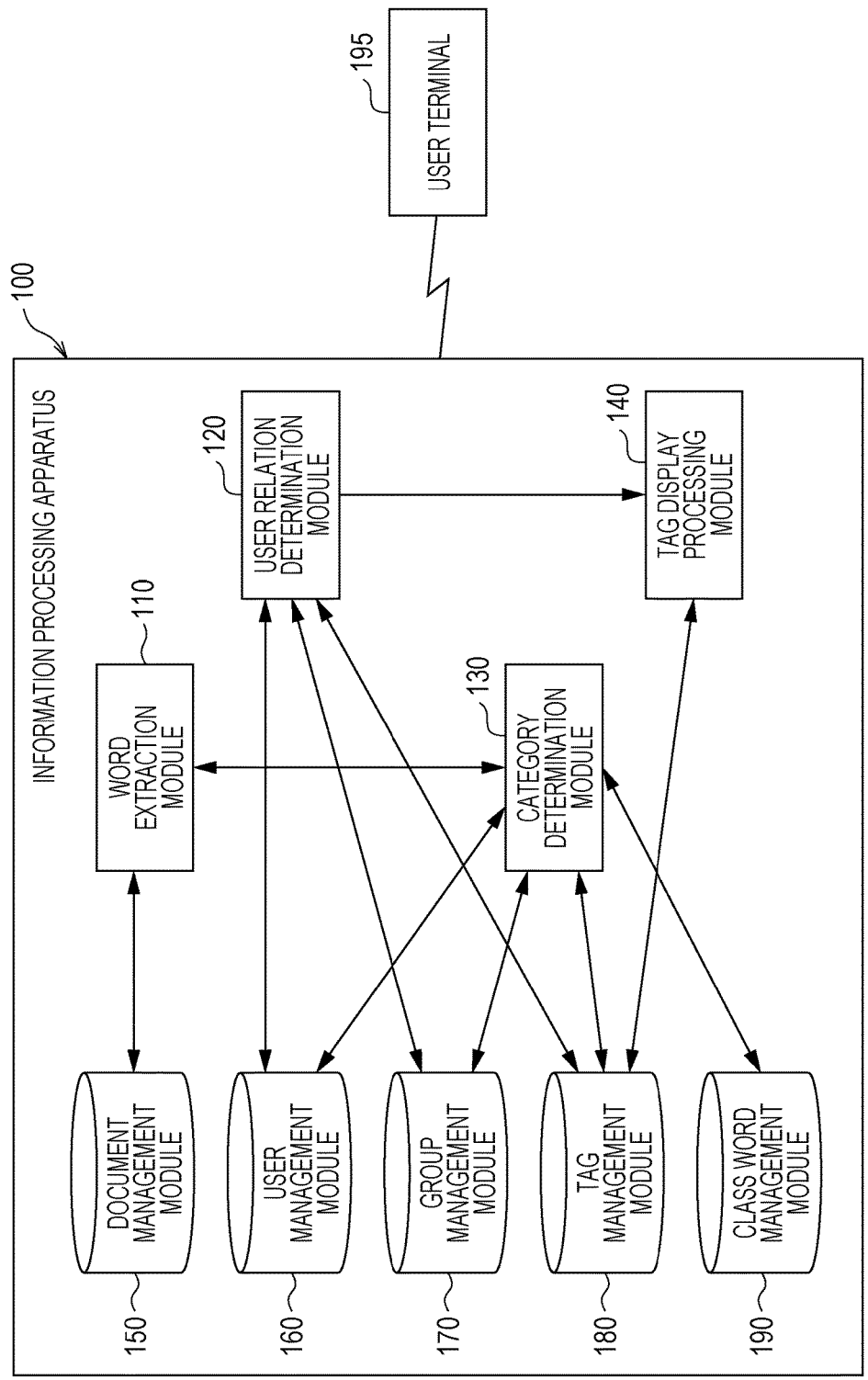
FIG. 1 is a conceptual module configuration diagram of a configuration example in this exemplary embodiment.

FIG. 1 is a conceptual module configuration diagram of a configuration example in this exemplary embodiment. It is to be noted that in general, the module refers to components such as software (computer program) and hardware that are logically separable. Thus, the module in this exemplary embodiment refers to not only a module in a computer program, but also a module in a hardware configuration. Therefore, in this exemplary embodiment, description of the following is also provided: a computer program (a program for causing a computer to execute corresponding steps, a program for causing a computer to function as a corresponding unit, a program for causing a computer to implement a corresponding function) for causing a computer to function as those modules, a system and a method. It is to be noted that although, "stores", "is stored", and equivalent words to these are used for the convenience of description, when the exemplary embodiment is a computer program, these words mean that "stored in a storage device" or "controlled to store in a storage device". In addition, although the module may have one-to-one correspondence with the function, in the implementation, one module may be constituted by one program, multiple modules may be constituted by one program, or conversely, one module may be constituted by multiple programs. In addition, multiple modules may be executed by one computer, or one module may be executed by multiple computers in a distributed or parallel environment. It is to be noted that one module may include other modules. Also, hereinafter in addition to the case of physical connection, "connection" is used for the case of logical connection (such as sending and receiving of data, instruction of data, and reference relationship between data). "Predetermined" refers to "determined before target processing is performed", and is used in the sense that not to mention before start of processing according to this exemplary embodiment, even after the start of the processing according to this exemplary embodiment, as long as target processing has not been started at a point of time, "predetermined" refers to "determined according to a situation or a state at the point of time or according to a situation or a state before the point of time". When multiple "predetermined values" are present, the values may be different from each other, or two or more values (not to mention including the case of all the values) may be the same. Also, a statement of "in the case where A, B is performed" is used in the sense that "whether or not A is determined, and in the case where it is determined that A, B is performed". However, the case where determination of whether or not A is unnecessary is excluded.

Also, a system or an apparatus may be implemented by one computer, hardware, devices, and others, as well as be constituted by connecting multiple computers, hardware, devices, and others via a communication unit such as a network (including one-to-one correspondence communication connection). The "apparatus" and the "system" are used as synonymous terms. Not to mention that the "system" does not include a system nothing more than a man-made social "mechanism" (social system).

For the processing performed by each module, or when multiple pieces of processing are performed in a module, for each piece of processing, target information is read from a storage device, and after the processing is performed, a result of the processing is written to the storage device. Thus, a description of reading from the storage device before processing and writing to the storage device after the processing may be omitted. It is to be noted that the storage device here may include a hard disk, a random access memory (RAM), an external storage medium, a storage device via a communication line, and a register in a central processing unit (CPU).

An information processing apparatus 100 in this exemplary embodiment presents tags indicating characteristics of users, and as illustrated in the example of FIG. 1, includes a word extraction module 110, a user relation determination module 120, a category determination module 130, a tag display processing module 140, a document management module 150, a user management module 160, a group management module 170, a tag management module 180, and a class word management module 190, and is connected to a user terminal 195.

A user is assigned a tag that indicates characteristics of the user. The tag is a word that indicates characteristics of the user. The tag is classified (categorized) into three, which are organization, work (including, for instance, description of work, work-related skills), personal-fact (including, for instance, a hobby, and an interest). The "characteristics" may include the area of activity and the experience of a target user. The "word" may include a term and a short clause. In general, a tag (tag group) presented as the introduction of a user is expressed as a series of short phrases. It is to be noted that the "presentation" includes printing by a printing device such as a printer, and outputting sound to a sound output device such as a speaker, in addition to displaying on a display device such as a liquid crystal display, and may include a combination of those.

The information processing apparatus 100 is connected to the user terminal 195 via a communication line. It is to be noted that multiple user terminals 195 may be provided.

The word extraction module 110 is connected to the category determination module 130 and the document management module 150. The word extraction module 110 extracts a word which may serve as a tag from a document stored in the document management module 150. Specifically, a word is extracted from the title, the text or the like of a document.

The user relation determination module 120 is connected to the tag display processing module 140, the user management module 160, the group management module 170, and the tag management module 180. The user relation determination module 120 determines a relation of tags between users.

The category determination module 130 is connected to the word extraction module 110, the user management module 160, the group management module 170, the tag management module 180, and the class word management module 190. The category determination module 130 determines the category of a tag.

The tag display processing module 140 is connected to the user relation determination module 120 and the tag management module 180. The tag display processing module 140 processes the details of a tag to be displayed based on a result processing performed by the user relation determination module 120 and the tags stored in the tag management module 180. The details of a tag to be displayed are personalized based on the information on tags added (set) to a viewing user and a viewed user. This allows a viewing user to view information desired by the viewing user. For instance, in the case where users belong to the same division, the tags are displayed in detail, including the groups to which the users belong. It is to be noted that a group is located lower than its division. Also, any tag other than a product of which both the viewing user and the viewed user are in charge is hidden, and for the product both are in charge of, the tags are displayed in detail, including respective parts of which both are in charge. It is to be noted that the parts included in a product are located lower than the product.

When a tag is in common between the viewing user and the viewed user, the tag display processing module 140 presents the common tag of the viewed user in detail compared with a tag which is not in common between the users. Here, "common" refers to the case of similar match in addition to the case of exact match.

The tags indicating characteristics of users are hierarchized. The tag display processing module 140 may present tags in detail by presenting the common tag, including each tag at a lower level of the hierarchy than the common tag.

In addition, for a tag not in common, the tag display processing module 140 may present a tag at a higher level of the hierarchy than the tag not in common. For instance, a "tag at a higher level" may be the tag at the highest level of the hierarchy, or may be a tag at the second highest level of the hierarchy.

Alternatively, tags may be classified (categorized) into multiple types. In the processing of the tag display processing module 140, whether or not a tag is common may be determined by comparing the tags belonging to the same classification. In other words, tags may be divided into categories, and a method of processing tags may be changed. The concerns of the viewing user may be selected from the categories.

In addition, the classification may include at least organization, and as a tag of a user, an organization to which the user belongs may be added. It is to be noted that the organization may be hierarchized based on the inclusion relation between groups.

In addition, the classification may include at least work, and as a tag of a user, a word extracted from a document related to the user (the user to whom a tag is added) may be added. It is to be noted that the work may be hierarchized utilizing the title and the content of a document edited by the user for the words present in the tags of the viewed user. For instance, the words in the title may be at the parent hierarchy level, and the words in the content (text) may be at the child hierarchy level. Also, as a document, an object class such as a blog may be used. In this case, the tags may be hierarchized by analyzing the content of and the hierarchy of the object class.

In addition, the classification may include at least personal-fact, and as a tag of a user, a word inputted by the user may be added. It is to be noted that class words may be prepared in advance from a dictionary, and may be hierarchized. For instance, even when a tag is present in a document, if the user is not engaged in editing of the document, the tag is not treated as information related to work and may be hierarchized as the personal-fact.

Also, the tag display processing module 140 may extract an organization corresponding to the position of the viewing user. When the organization corresponding to the position matches the organization to which the viewed user belongs, the tag display processing module 140 may present the tags of the organization in detail.

When the viewing user has a mobile terminal, the tag display processing module 140 may identify the position of the user from the mobile terminal, and may present a tag to the mobile terminal. Specifically, when the viewing user is present at the location of a specific organization, and is viewing a user at the location of the organization, the tag display processing module 140 may present the tags of the organization in detail using the position information on the mobile terminal.

The document management module 150 is connected to the word extraction module 110. The document management module 150 stores documents. For instance, the document management module 150 stores a document 1000 illustrated in the example of FIGS. 10A and 10B described later.

The user management module 160 is connected to the user relation determination module 120 and the category determination module 130.

The user management module 160 records the users who are registered in the information processing apparatus 100. For instance, the user management module 160 stores a profile table 300 illustrated in the example of FIG. 3 described later.

The group management module 170 is connected to the user relation determination module 120 and the category determination module 130. The group management module 170 records the groups which are registered in the information processing apparatus 100. For instance, the group management module 170 stores a root 700, an organization and position table 2200 illustrated in the later-described examples of FIG. 7, FIG. 22, respectively.

The tag management module 180 is connected to the user relation determination module 120, the category determination module 130, and the tag display processing module 140. The tag management module 180 stores tags (including added tags). For instance, the tag management module 180 stores a tag classification table 500, a related organization table 800, a related work table 1100, and a related personal-fact table 1500 illustrated in the later-described examples of FIG. 5, FIGS. 8A to 8C, FIGS. 11A to 11C, FIGS. 15A to 15C, respectively.

The class word management module 190 is connected to the category determination module 130. The class word management module 190 stores class words for words. For instance, the class word management module 190 stores a class word table 1300 illustrated in the later-described example of FIG. 13.

The user terminal 195 is connected to the information processing apparatus 100. The user terminal 195 performs registration of a document, additional editing of a tag, and viewing of a tag. Specifically, the user terminal 195 registers a document in the information processing apparatus 100 (the document management module 150) according to an operation of a user. Also, a tag is added to the profile of a user (another user, a user himself or herself) according to an operation of the user or a result of processing (for instance, processing of the word extraction module 110, that accompanies registration of a document) performed by the word extraction module 110. The tags in the profile of a user (another user, a user himself or herself) are viewed according to an operation of the user.

Figure 2:
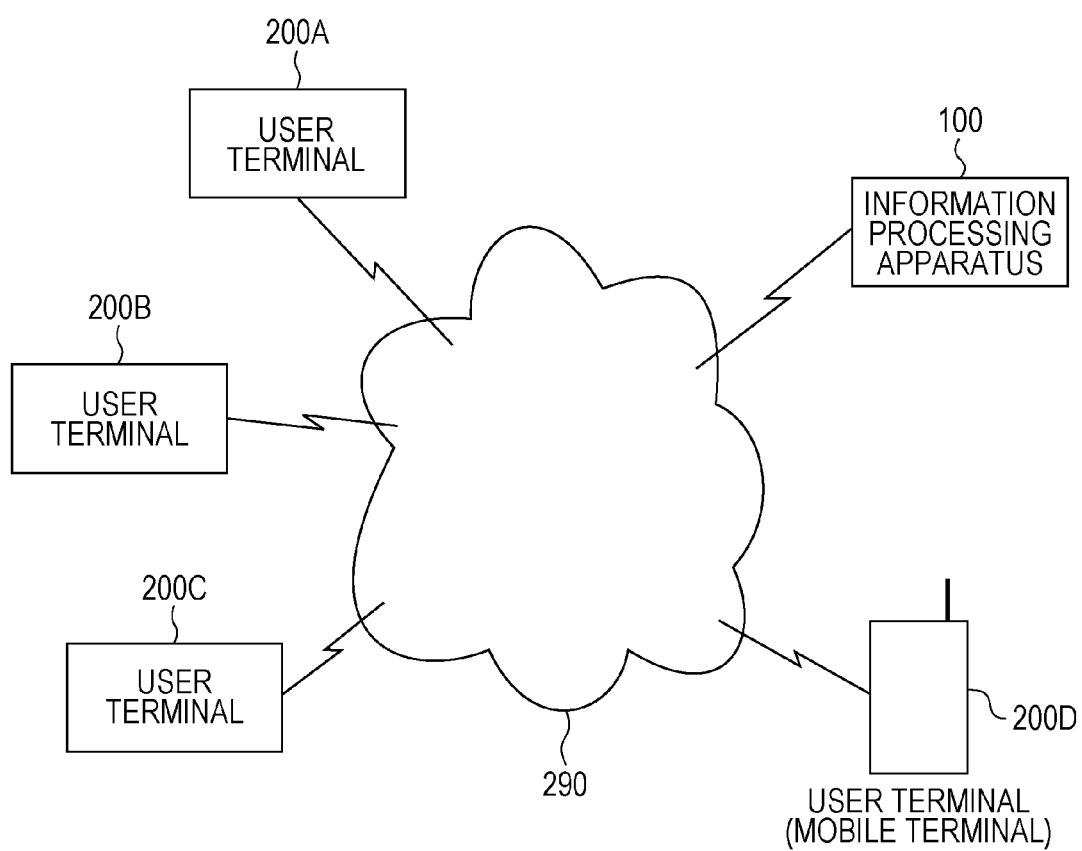
FIG. 2 is an explanatory diagram illustrating a system configuration example utilizing this exemplary embodiment.

FIG. 2 is an explanatory diagram illustrating a system configuration example utilizing this exemplary embodiment.

The information processing apparatus 100, a user terminal 200A, a user terminal 200B, a user terminal 200C, and a user terminal (mobile terminal) 200D are connected to each other via a communication line 290. The communication lines 290 may be wireless, wired, or a combination of these, and may be, for instance, the internet, the intranet as communication infrastructure. Also, the function of the information processing apparatus 100 may be implemented as a cloud service.

For instance, the user terminal 200A communicates with the information processing apparatus 100 according to an operation of a user A (viewing user), logs-in SNS or the like, and presents the profile of another user B (viewed user). As the profile, the photograph and tag of the user are presented. The tags are hierarchized, and when a tag is in common between the tags of the user A and the tags of the user B, each tag at a lower level of the hierarchy than the common tag is presented. When there is no common tag, a tag at the highest level of the tag is presented. In addition, when the profile of another user B is presented to the user terminal (mobile terminal) 200D, if the organization at the position where the user terminal (mobile terminal) 200D is present matches the organization of the user B, the tags of the organization are presented in detail.

Profile information of a user presented in SNS or the like includes, for instance, the profile table 300. FIG. 3 is an explanatory table illustrating a data structure example of the profile table 300. The profile table 300 has a user ID column 305, a user name column 310, an extension number column 315, a mail address column 320, a division column 325, a work location column 330, a number of tags column 335, and a tag ID column 340. In this exemplary embodiment, the user ID column 305 stores information (user ID: IDentification) for identifying a user uniquely. The user name column 310 stores the user name of the user. The extension number column 315 stores the extension number of the user. The mail address column 320 stores the mail address of the user. The division column 325 stores the division of the user. The work location column 330 stores the work location of the user. The number of tags column 335 stores the number of tags added to the user. In this exemplary embodiment, the tag ID column 340 stores information (tag ID) for uniquely identifying the tags added to the user. The tag ID column 340 stores as many tag IDs as the number in the number of tags column 335.

Figure 4:
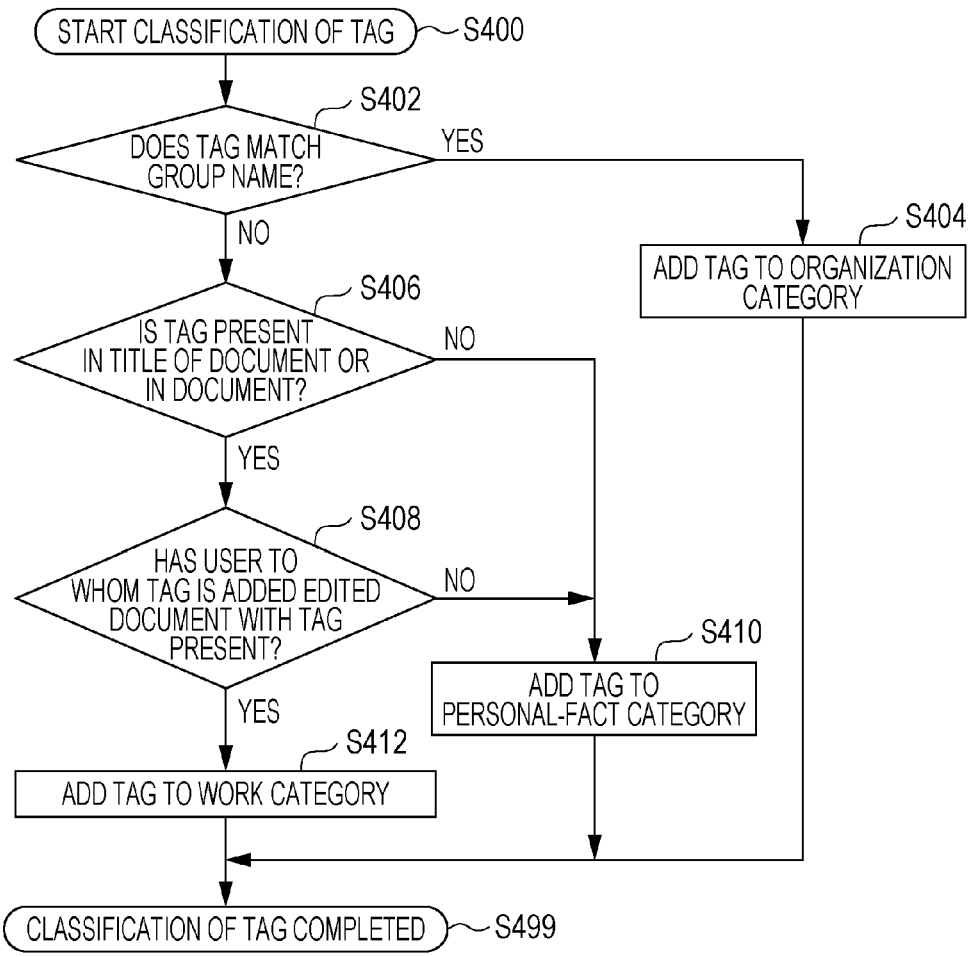
FIG. 4 is a flowchart illustrating a processing example according to this exemplary embodiment.

FIG. 4 is a flowchart illustrating a processing example according to this exemplary embodiment. The flowchart illustrates an example of addition and classification processing for a tag.

In step S400, classification processing for the tag is started.

In step S402, it is determined whether or not the tag matches the group name of an organization, and in the case of matching, the flow proceeds to step S404, otherwise the flow proceeds to step S406.

In step S404, the tag is added to the category of organization, and classification of the tag is completed (step S499).

In step S406, it is determined whether or not the tag is present in the title of a document or in a document, and when the tag is present, the flow proceeds to step S408, otherwise the flow proceeds to step S410.

In step S408, it is determined whether or not the document in which the tag is present is edited by the user to whom the tag is added, and when the document is edited by the user, the flow proceeds to step S412, otherwise the flow proceeds to step S410.

In step S410, the tag is added to the category of personal-fact, and classification of the tag is completed (step S499).

In step S412, the tag is added to the category of work.

In step S499, the classification processing for the tag is completed.

Specifically, the processing as follows is performed.

In step S402, when the tag to be added is present as a group name (YES in step S402), the tag is added to the category of organization (step S404). When the tag is not present (NO in step S402), it is identified whether or not the tag to be added is included in the title of a document or in a document (step S406). It is to be noted that the tag to be added here is a word inputted by a user or a predetermined word, and may be a tag as the profile of the user himself or herself or a tag as the profile of the another user.

In step S404, the tag is added to the category of organization. The processing flow for addition to the category of organization tag will be described using FIG. 6.

In step S406, when the tag to be added is included in the title of a document or in a document (YES in step S406), it is identified whether or not the document in which the tag is present is edited by the user to whom the tag is added (step S408). When the tag to be added is not included in the title of a document or in a document (NO in step S406), the tag is added to the category of personal-fact (step S410).

In step S408, when the user to whom the tag is added has edited the document (YES in step S408), the tag is added to the category of work (step S412). When the user has not edited the document (NO in step S408), the tag is added to the category of personal-fact (step S410).

In step S410, the tag is added to the category of personal-fact. The processing flow for addition to the category of personal-fact tag will be described using FIG. 12.

In step S412, the tag is added to the category of work. The processing flow for addition to the category of work tag will be described using FIG. 9.

Figure 5:
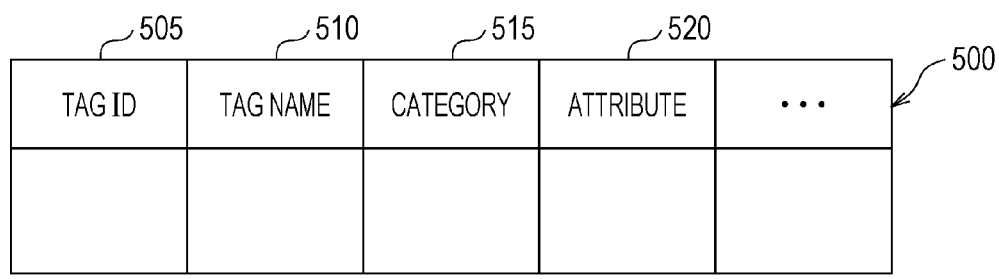
FIG. 5 is an explanatory table illustrating a data structure example of a tag classification table.

The tag classification table 500 is generated by the processing example illustrated in the example of FIG. 4. FIG. 5 is an explanatory table illustrating a data structure example of the tag classification table 500. The tag classification table 500 includes a tag ID column 505, a tag name column 510, a category column 515, and an attribute column 520. The tag ID column 505 stores a tag ID. It is to be noted that the tag ID column 505 may be referred to by the tag ID column 340 of the profile table 300. The tag name column 510 stores the name (for instance, the word presented as the tag) of the tag. The category column 515 stores the category to which the tag belongs. In the above-described example, one of the category types of "organization", "work", and "personal-fact" is stored in the category column 515. The attribute column 520 stores the attribute of the tag. For instance, when the category type is work, the attribute corresponds to the document ID or the like of a document in which the tag is included. In addition, the attribute may be the date and time (which may be the year, month, date, time, hour, minute, second, under second, or a combination of these) when the tag is generated, or the user ID of a user who has inputted the tag.

Figure 6:
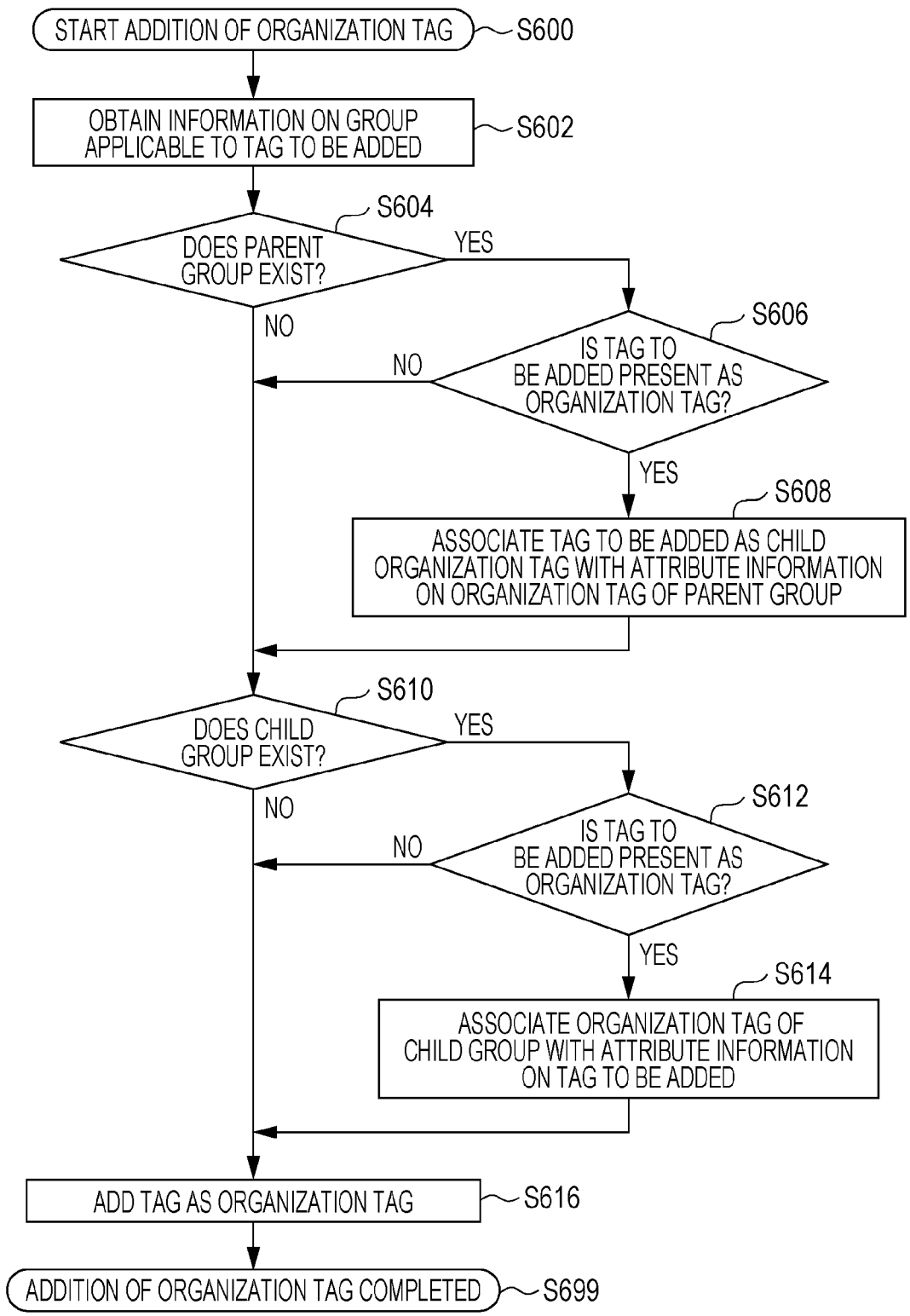
FIG. 6 is a flowchart illustrating a processing example according to this exemplary embodiment.

FIG. 6 is a flowchart illustrating a processing example according to this exemplary embodiment. The flowchart illustrates a processing example for addition of a tag in the category type of organization.

In step S600, processing of adding an organization tag is started.

In step S602, information on the group applicable to the tag to be added is obtained.

In step S604, it is determined whether or not a parent group exists, and when a parent group exists, the flow proceeds to step S606, otherwise the flow proceeds to step S610.

In step S606, it is determined whether or not the tag to be added is present as an organization tag, and when present as an organization tag, the flow proceeds to step S608, otherwise the flow proceeds to step S610.

In step S608, the tag to be added as an organization tag is associated with the attribute information on the organization tag in a parent group, and the flow proceeds to step S610.

In step S610, it is determined whether or not a child group exists, and when a child group is exists, the flow proceeds to step S612, otherwise the flow proceeds to step S616.

In step S612, it is determined whether or not the tag to be added is present as an organization tag, and when present, the flow proceeds to step S614, otherwise the flow proceeds to step S616.

In step S614, the organization tag of the child group is associated with the attribute information on the tag to be added, and the flow proceeds to step S616.

In step S616, the tag is added as an organization tag.

In step S699, the processing of adding an organization tag is completed.

Specifically, the processing as follows is performed.

Figure 7:
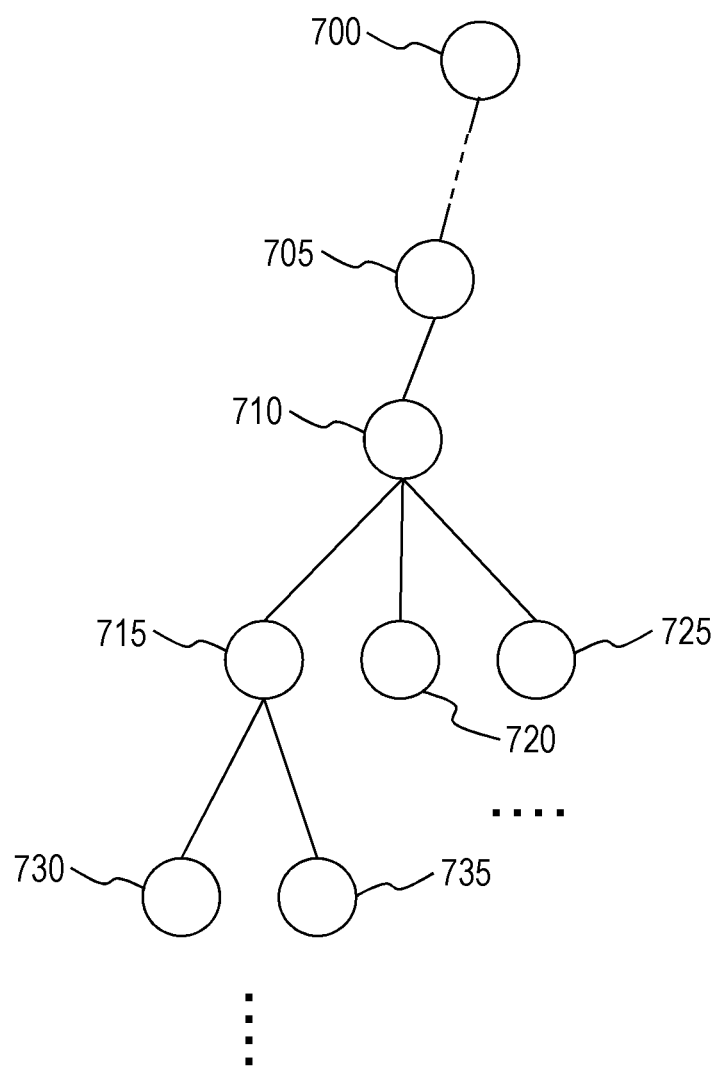
FIG. 7 is an explanatory diagram illustrating a hierarchical structure example of an organization tag.

In step S602, group information applicable to the tag to be added is obtained. For instance, as illustrated in the example of FIG. 7, the organization is hierarchized. FIG. 7 is an explanatory diagram illustrating a hierarchical structure example of an organization tag. A parent group 705 is located at a lower level of the root 700. A target group 710 is located at a lower level of the parent group 705. A child group 715, a child group 720, and a child group 725 are located at a lower level of the target group 710. A child group 730 and a child group 735 are located at a lower level of the child group 715. This is so-called an organization chart.

In step S604, when a parent group exists (YES in step S604), it is identified whether or not the parent group is present as an organization tag (step S606). When not present (NO in step S604), the processing related to the parent group is completed, and it is identified whether or not a child group exists (step S610).

In step S606, when the parent group is present as an organization tag (YES in step S606), the tag to be added as a child organization tag associated with the attribute information on the organization tag of the parent group (step S608). When not present (NO in step S606), the processing related to the parent group is completed, and the flow proceeds to step S610.

In step S608, the tag to be added as a child organization tag is associated with the attribute information on the organization tag of the parent group. Subsequently, the flow proceeds to step S610.

In step S610, when a child group exists (YES in step S610), it is identified whether or not the child group is present as an organization tag (step S612). When not present (NO in step S610), the processing related to the child group is completed, and the tag is added as an organization tag (step S616).

In step S612, when the child group is present as an organization tag (YES in step S612), the organization tag of the child group is associated with the attribute information on the tag to be added (step S614), When not present (NO in step S612), the processing related to the child group is completed, and the flow proceeds to step S616.

In step S614, the organization tag of the child group is associated with the attribute information on the tag to be added. Subsequently, the flow proceeds to step S616.

In step S616, the tag is added as an organization tag.

Figure 8A:
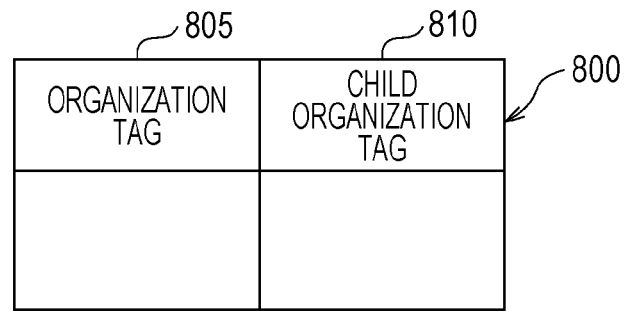
FIGS. 8A to 8C are explanatory tables illustrating a data structure example of a related organization table.
Figure 8B:
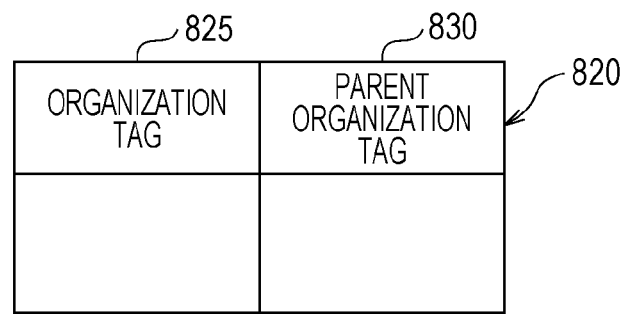
Figure 8C:
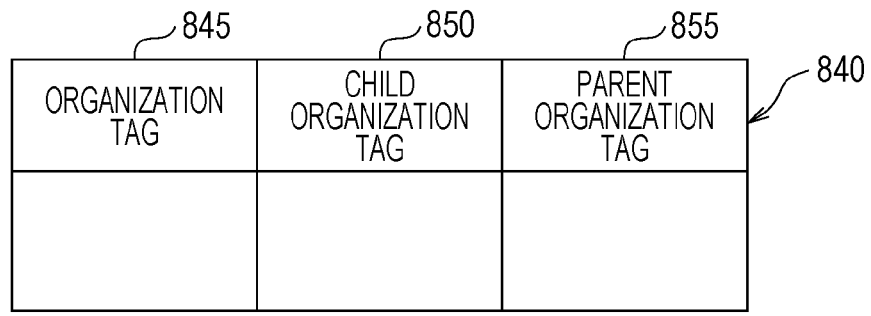

At least one of the related organization table 800, a related organization table 820, and a related organization table 840 is generated by the processing example illustrated in the example of FIG. 6. FIGS. 8A to 8C are explanatory tables illustrating a data structure example of the related organization table 800 and other tables.

FIG. 8A is an explanatory table illustrating a data structure example of the related organization table 800. The related organization table 800 illustrates the relationship between a target organization tag and a lower level of the hierarchy. The related organization table 800 has an organization tag column 805 and a child organization tag column 810. The organization tag column 805 stores an organization tag. The child organization tag column 810 stores a child organization tag at a lower level of the hierarchy of the organization tag.

FIG. 8B is an explanatory table illustrating a data structure example of the related organization table 820. The related organization table 820 illustrates the relationship between a target organization tag and a higher level of the hierarchy. The related organization table 820 has an organization tag column 825 and a parent organization tag column 830. The organization tag column 825 stores an organization tag. The parent organization tag column 830 stores a parent organization tag at a higher level of the hierarchy of the organization tag.

FIG. 8C is an explanatory table illustrating a data structure example of the related organization table 840. The related organization table 840 illustrates the relationship between a target organization tag and lower and higher levels in the hierarchy. The related organization table 840 has an organization tag column 845, a child organization tag column 850, and a parent organization tag column 855. The organization tag column 845 stores an organization tag. The child organization tag column 850 stores a child organization tag at a lower level of the hierarchy of the organization tag. The parent organization tag column 855 stores a parent organization tag at a higher level of the hierarchy of the organization tag.

Figure 9:
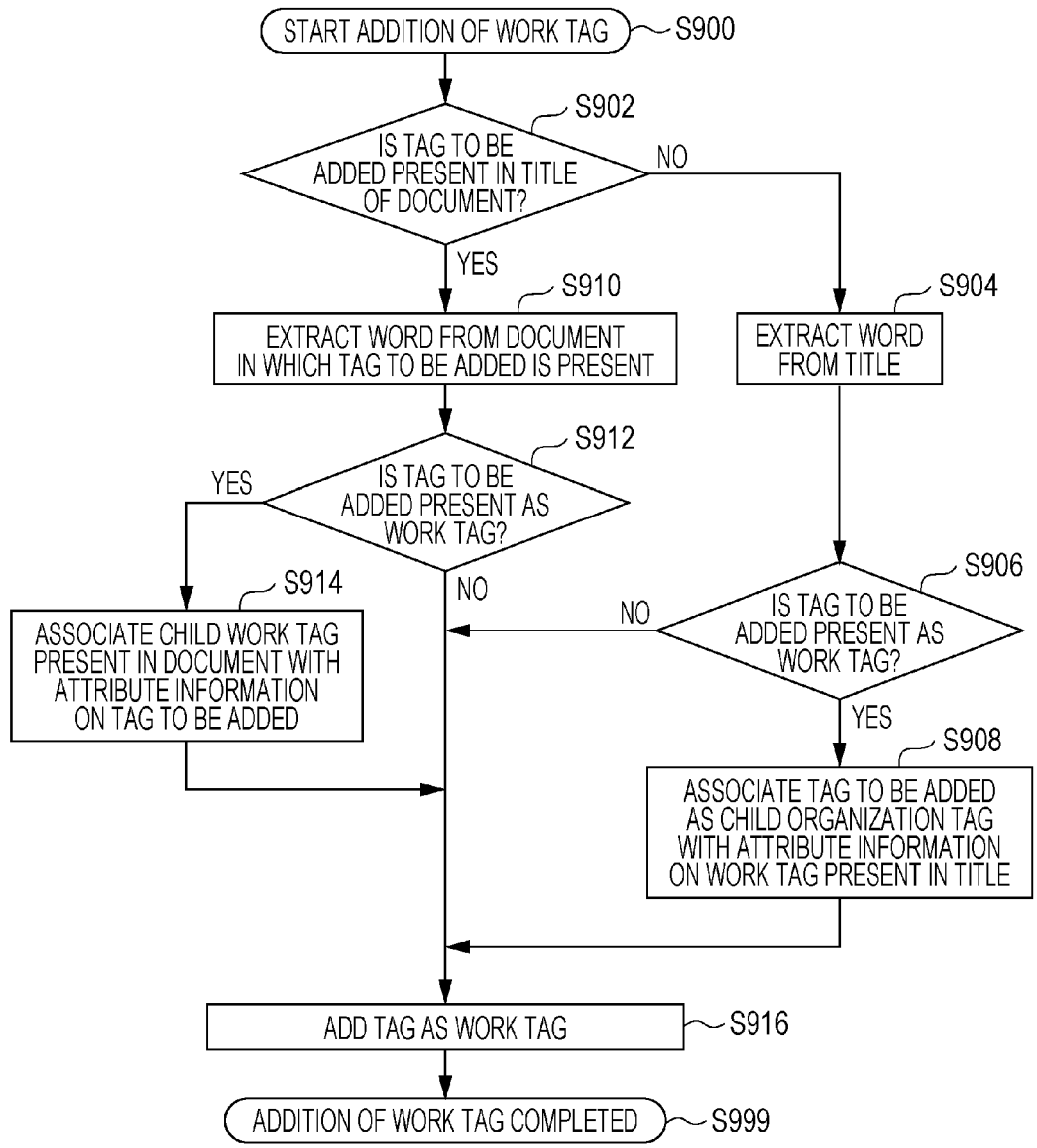
FIG. 9 is flowchart illustrating a processing example according to this exemplary embodiment.

FIG. 9 is a flowchart illustrating a processing example according to this exemplary embodiment. The flowchart illustrates a processing example for addition of a tag in the category type of work.

In step S900, processing of adding a work tag is started.

In step S902, it is determined whether or not the tag to be added is present in the title of a document, and when present, the flow proceeds to step S910, otherwise the flow proceeds to step S904.

In step S904, a word is extracted from the title.

In step S906, it is determined whether or not the tag to be added is present as a work tag, and when present, the flow proceeds to step S908, otherwise the flow proceeds to step S916.

In step S908, the tag to be added as a child work tag is associated with the attribute information on the work tag which is present in the title, and the flow proceeds to step S916.

In stew S910, a word is extracted from the document in which the tag to be added is present.

In step S912, it is determined whether or not the tag to be added is present as a work tag, and when present, the flow proceeds to step S914, otherwise the flow proceeds to step S916.

In step S914, a child work tag which is present in the document is associated with the attribute information on the tag to be added, and the flow proceeds to step S916.

In step S916, the tag is added as a work tag.

In step S999, the processing of adding a work tag is completed.

Specifically, the processing as follows is performed.

In step S902, when the tag to be added is present in the title of a document (YES in step S902), a word is extracted from the document in which the tag to be added is present (step S910). When the tag to be added is not present (NO in step S902), a word is extracted from the title (step S904). It is to be noted that the document is related to the user to whom the tag is added. As described above, examples of document related to the user may include a document which has been edited (including been created) by the user, a document which has been viewed by the user, and a document to which the user has a right to access. In addition, examples of document related to the user may include a document which has been edited, viewed by a member of the group to which the user belongs, and a document to which the member has a right to access.

In step S904, a word is extracted from the title of the document.

In step S906, when the word extracted in step S904 is present as a work tag (YES in step S906), the tag to be added as a child work tag is associated with the attribute information on the work tag which is present in the title (step S908). When the tag to be added is not present (NO in step S906), the tag is not associated with anything, and added as a work tag (step S916).

In step S908, the tag to be added as a child work tag is associated with the attribute information on the work tag which is present in the title. Subsequently, the flow proceeds to step S916.

In step S910, a word is extracted from the document (text) in which the tag to be added is present.

In step S912, when the word extracted in step S910 is present as a work tag (YES in step S912), a child work tag which is present in the document is associated with the attribute information on the tag to be added (step S914). When the word is not present (NO in step S912), the tag is not associated with anything, and added as a work tag (step S916).

In step S914, a child work tag which is present in the document is associated with the attribute information on the tag to be added. Subsequently, the flow proceeds to step S916.

In step S916, the tag is added as a work tag.

FIGS. 10A and 10B are explanatory diagrams illustrating a hierarchical structure example of a work tag. The relationship between the words related to work document 1000 illustrated in the example of FIG. 10A, and the work tags which are the nodes in the hierarchy illustrated in the example of FIG. 10B is as described below. It is to be noted that although two hierarchies of the title and the text are targets in the example of FIG. 9, three or more hierarchies (in this example, three hierarchies: a chapter title 1010, a paragraph title 1020, and a text 1030) may be targets as illustrated in the example of FIGS. 10A and 10B.

A work word 1012 in the chapter title 1010 corresponds to a chapter title and work tag 1060, a work word 1022 in the paragraph title 1020 corresponds to a paragraph title and work tag 1062, a work word 1032 and a work word 1034 in the text 1030 correspond to a text and work tag 1064 and a text and a work tag 1066, respectively, a work word 1042 in a paragraph title 1040 corresponds to a paragraph title and work tag 1068, and a work word 1052, a work word 1054, and a work word 1056 in a text 1050 correspond to a text and work tag 1070, a to and work tag 1072, and a text and work tag 1074, respectively.

Figure 11A:
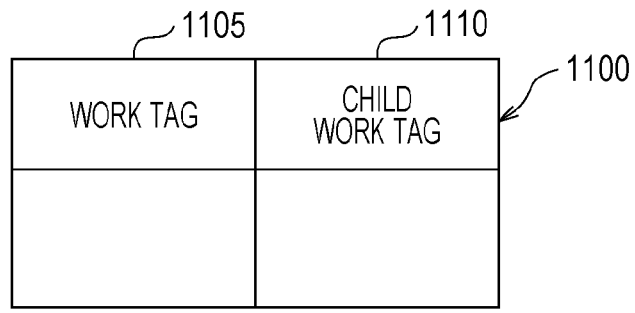
FIGS. 11A to 11C are explanatory tables illustrating a data structure example of a related work table.
Figure 11B:
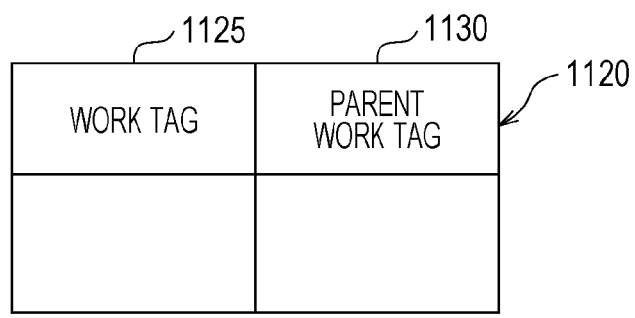
Figure 11C:
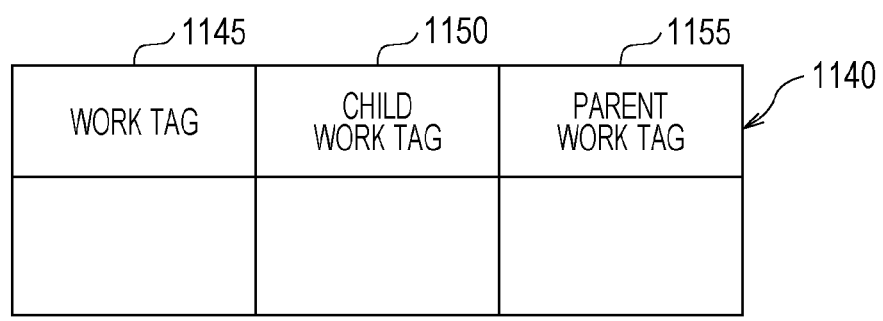

At least one of a related work table 1100, a related work table 1120, and a related work table 1140 is generated by the processing example illustrated in the example of FIG. 9. FIGS. 11A to 11C are explanatory tables illustrating a data structure example of the related work table 1100.

FIG. 11A is an explanatory diagram illustrating a data structure example of the related work table 1100. The related work table 1100 illustrates the relationship between a target work tag and a lower level of the hierarchy. The related work table 1100 has a work tag column 1105 and a child work tag column 1110. The work tag column 1105 stores a work tag. The child work tag column 1110 stores a child work tag at a lower level of the hierarchy of the work tag.

FIG. 11B is an explanatory diagram illustrating a data structure example of the related work table 1120. The related work table 1120 illustrates the relationship between a target work tag and a higher level of the hierarchy. The related work table 1120 has a work tag column 1125 and a parent work tag column 1130. The work tag column 1125 stores a work tag. The parent work tag column 1130 stores a parent work tag at a higher level of the hierarchy of the work tag.

FIG. 11C is an explanatory diagram illustrating a data structure example of the related work table 1140. The related work table 1140 illustrates the relationship between a target work tag and lower and higher levels in the hierarchy. The related work table 1140 has a work tag column 1145, a child work tag column 1150, and a parent work tag column 1155.

The work tag column 1145 stores a work tag. The child work tag column 1150 stores a child work tag at a lower level of the hierarchy of the work tag. The parent work tag column 1155 stores a parent work tag at a higher level of the hierarchy of the work tag.

Figure 12:
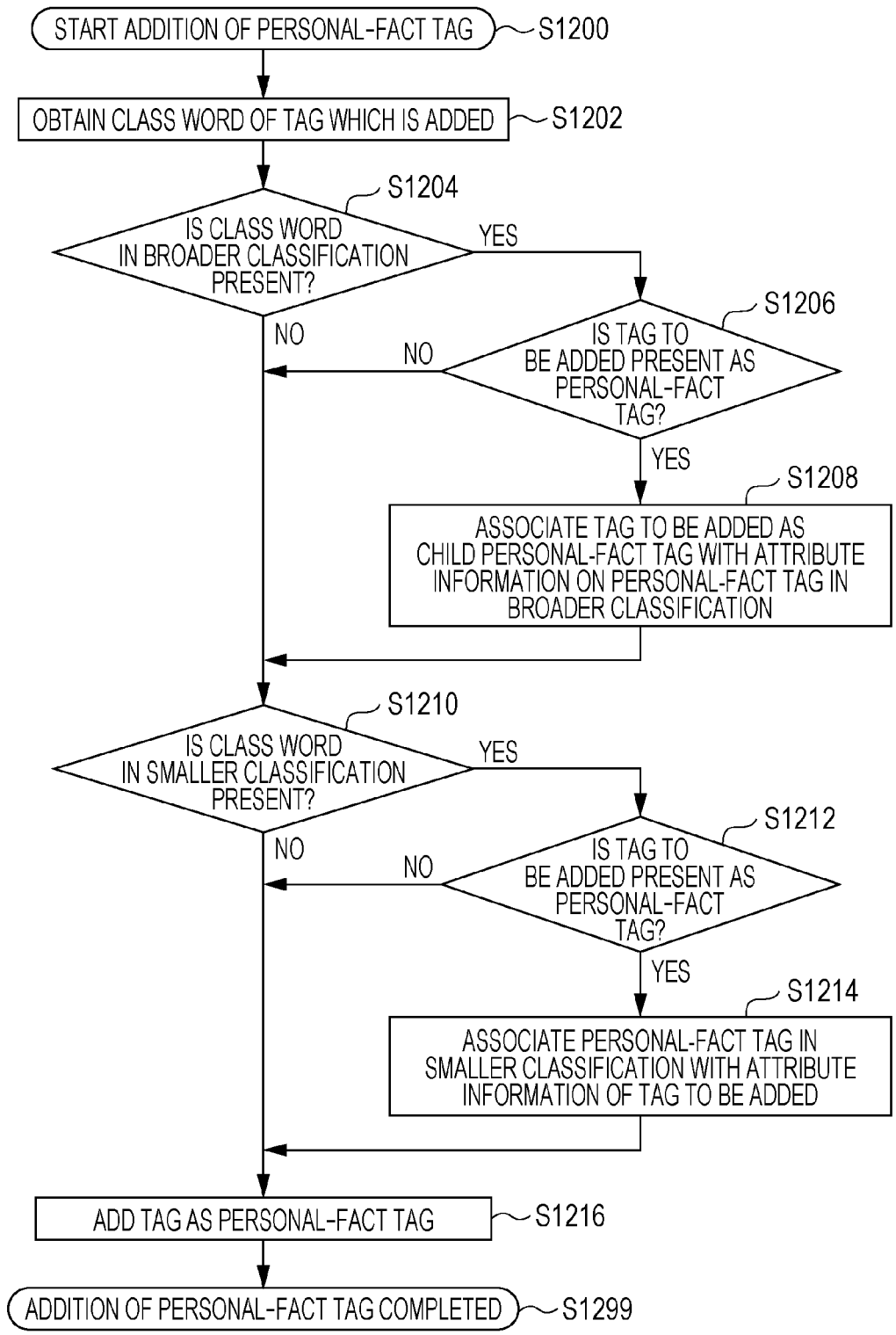
FIG. 12 is a flowchart illustrating a processing example according to this exemplary embodiment.

FIG. 12 is a flowchart illustrating a processing example according to this exemplary embodiment. The flowchart illustrates a processing example for addition of a tag in the category type of personal-fact.

In step S1200, processing of adding a personal-fact tag is started.

In step S1202, a class word of the tag to be added is obtained.

In step S1204, it is determined whether or not a class word in a broader classification is present, and when present, the flow proceeds to step S1206, otherwise the flow proceeds to step S1210.

In step S1206, it is determined whether or not the class word is present as a personal-fact tag, when present, the flow proceeds to step S1208, otherwise the flow proceeds to step S1210.

In step S1208, the tag to be added as a child personal-fact tag is associated with the attribute information on the personal-fact tag in a broader classification, and the flow proceeds to step S1210.

In step S1210, it is determined whether or not a class word in a smaller classification is present, when present, the flow proceeds to step S1212, otherwise the flow proceeds to step S1216.

In step S1212, it is determined whether or not the class word is present as a personal-fact tag, when present, the flow proceeds to step S1214, otherwise the flow proceeds to step S1216.

In step S1214, the personal-fact tag in a smaller classification is associated with the attribute information on the tag to be added, and the flow proceeds S1216.

In step S1216, the tag is added as a personal-fact tag.

In step S1299, the processing of adding a personal-fact tag is completed.

Specifically, the processing as follows is performed.

Figure 13:
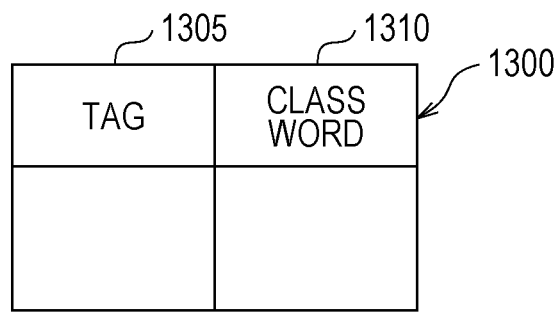
FIG. 13 is an explanatory table illustrating a data structure example of a class word table.

In step S1202, a class word of the tag to be added is obtained. For instance, a class word is obtained from the class word table 1300. FIG. 13 is an explanatory table illustrating a data structure example of the class word table 1300. The class word table 1300 has a tag column 1305 and a class word column 1310. The tag column 1305 stores a tag. The class word column 1310 stores a class word of the tag (word).

In step S1204, when a class word in a broader classification is present for a target tag or a class word of the tag (YES in step S1204), it is identified whether or not a class word in a broader classification is present as a personal-fact tag (step S1206). When the class word is not present (NO in step S1204), the processing related to the class word in a broader classification is completed, and it is identified whether a class word in a smaller classification is present (step S1210).

Figure 14:
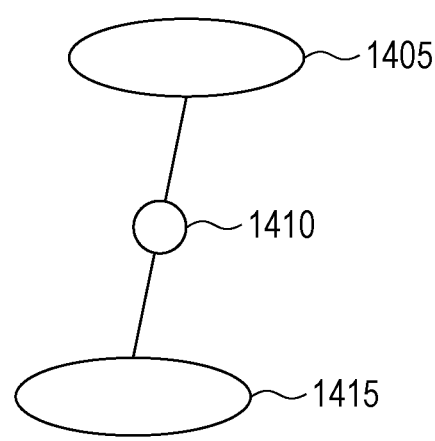
FIG. 14 is an explanatory diagram illustrating a hierarchical structure example of a personal-fact tag.

As illustrated in the example of FIG. 14, a hierarchical relationship exists between tags (or class words). FIG. 14 is an explanatory diagram illustrating a hierarchical structure example of a personal-fact tag. A target personal-fact tag 1410 is located at a lower level of a broader classification tag 1405, and a smaller classification tag 1415 is located at a lower level of the target personal-fact tag 1410.

In step S1206, when a class word in a broader classification is present as a personal-fact tag (YES in step S1206), the tag to be added as a child personal-fact tag is associated with the attribute information on the personal-fact tag in a broader classification (step S1208). When the class word is not present (NO in step S1206), the processing related to the class word in a broader classification is completed, and the flow proceeds to step S1210.

In step S1208, the tag to be added as a child personal-fact tag is associated with the attribute information on the personal-fact tag in a broader classification.

In step S1210, when a class word in a smaller classification is present (YES in step S1210), it is identified whether or not a class word in a smaller classification is present as a personal-fact tag (step S1212). When the class word is not present (NO in step S1210), the processing related to the class word in a smaller classification is completed, and the tag is added as a personal-fact tag (step S1216).

In step S1212, when a class word in a smaller classification is present as a personal-fact tag (YES in step S1212), the personal-fact tag in a smaller classification is associated with the attribute information on the tag to be added (step S1214). When the class word is not present (NO in step S1212), the processing related to the class word in a smaller classification is completed, and the flow proceeds to step S1216.

In step S1214, the personal-fact tag in a smaller classification is associated with the attribute information on the tag to be added.

In step S1216, the tag is added as a personal-fact tag.

Figure 15A:
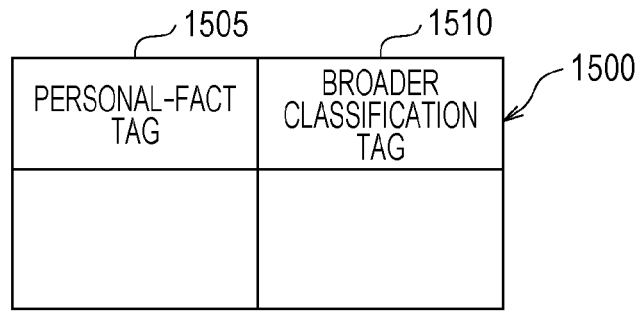
FIGS. 15A to 15C are explanatory tables illustrating a data structure example of a related personal-fact table.
Figure 15B:
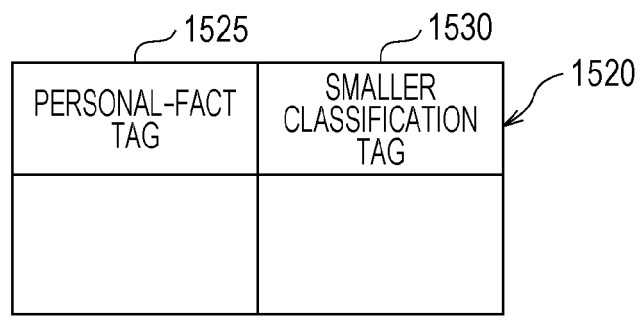
Figure 15C:
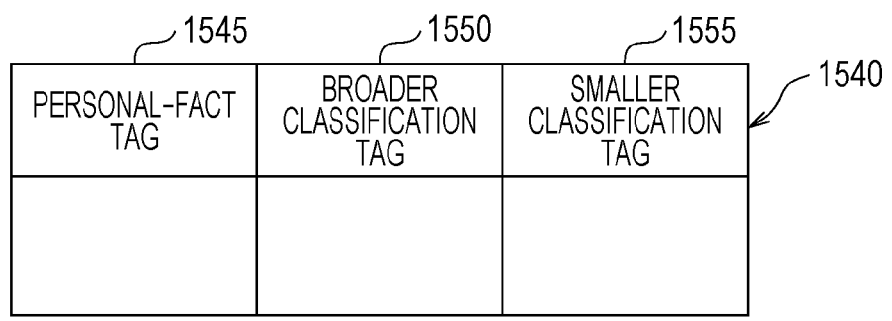

At least one of the related personal-fact table 1500, a related personal-fact table 1520, and a related personal-fact table 1540 is generated by the processing example illustrated in the example of FIG. 12. FIGS. 15A to 15C are explanatory tables illustrating a data structure example of the related personal-fact table 1500.

FIG. 15A is an explanatory diagram illustrating a data structure example of the related personal-fact table 1500. The related work table 1500 illustrates the relationship between a target personal-fact tag and a higher level of the hierarchy. The related personal-fact table 1500 has a personal-fact tag column 1505 and a broader classification tag column 1510. The personal-fact tag column 1505 stores a personal-fact tag. The broader classification tag column 1510 stores a broader classification tag at a higher level of the hierarchy of the personal-fact tag.

FIG. 15B is an explanatory diagram illustrating a data structure example of the related personal-fact table 1520. The related personal-fact table 1520 illustrates the relationship between a target personal-fact tag and a lower level of the hierarchy. The related personal-fact table 1520 has a personal-fact tag column 1525 and a smaller classification tag column 1530. The personal-fact tag column 1525 stores a personal-fact tag. The smaller classification tag column 1530 stores a smaller classification tag at a lower level of the hierarchy of the personal-fact tag.

FIG. 15C is an explanatory diagram illustrating a data structure example of the related personal-fact table 1540. The related personal-fact table 1540 illustrates the relationship between a target personal-fact tag and lower and higher levels in the hierarchy. The related personal-fact table 1540 has a personal-fact tag column 1545, a broader classification tag column 1550, and a smaller classification tag column 1555. The personal-fact tag column 1545 stores a personal-fact tag. The broader classification tag column 1550 stores a broader classification tag at a higher level of the hierarchy of the personal-fact tag. The smaller classification tag column 1555 stores a smaller classification tag at a lower level of the hierarchy of the personal-fact tag.

Figure 16:
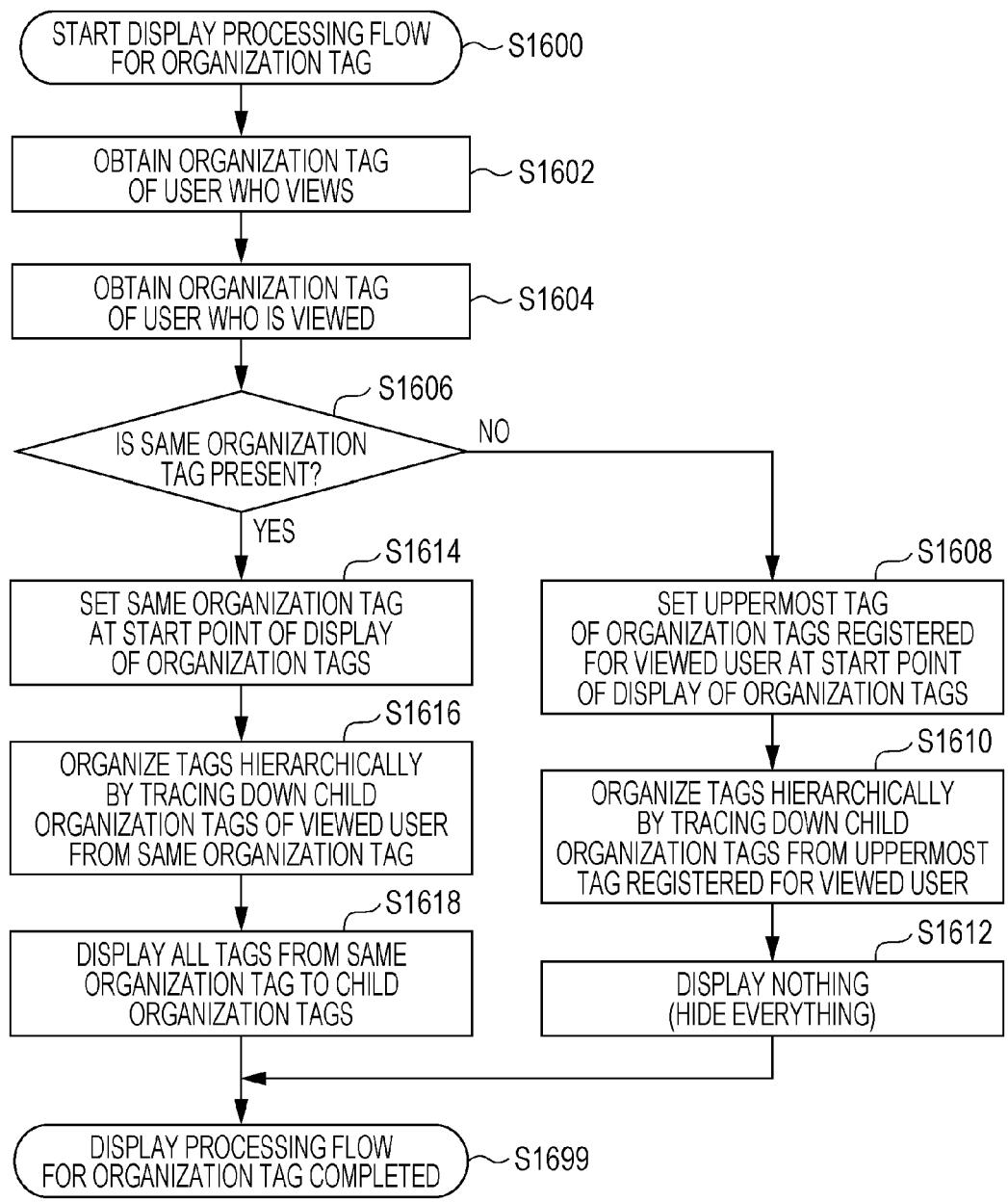
FIG. 16 is a flowchart illustrating a processing example according to this exemplary embodiment.

FIG. 16 is a flowchart illustrating a processing example according to this exemplary embodiment (tag display processing module 140). The flowchart illustrates a processing example of display processing for organization tags.

In step S1600, a display processing flow for organization tags is started.

In step S1602, an organization tag of a viewing user is obtained.

In step S1604, an organization tag of a viewed user is obtained.

In step S1606, it is determined whether or not the same organization tag is present, and when present, the flow proceeds to step S1614, otherwise the flow proceeds to step S1608.

In step S1608, the uppermost tag of the organization tags registered for the viewed user is set at the start point of display of the organization tags.

In step S1610, the tags are hierarchically organized by tracing down child organization tags from the uppermost tag registered for the viewed user.

In step S1612, nothing is displayed (everything is hidden), and the display processing flow for organization tags is completed (step S1699).

In step S1614, the same organization tag is set at the start point of display of the organization tags.

In step S1616, the tags are hierarchically organized by tracing down child organization tags of a viewed user from the same organization tag.

In step S1618, all tags are displayed from the same organization tag to the child organization tags.

In step S1699, the display processing flow for organization tags is completed.

Specifically, the processing as follows is performed.

In step S1602, an organization tag of a viewing user is obtained.

In step S1604, an organization tag of a viewed user is obtained.

In step S1606, when the same organization tag is present between the viewing user and the viewed user (YES in step S1606), the same organization tag is set at the start point of display of the organization tags (step S1614). When the same organization tag is not present (NO in step S1606), the uppermost tag of the organization tags registered for the viewed user is set at the start point of display of the organization tags (step S1608).

In step S1608, the uppermost tag of the organization tags registered for the viewed user is set at the start point of display of the organization tags.

In step S1610, the tags are hierarchically organized by tracing down child organization tags from the uppermost tag registered for the viewed user.

In step S1612, nothing is displayed (everything is hidden). It is to be noted that tags at a higher level of the hierarchy (for instance, the uppermost (root), the second hierarchies) may be displayed rather than nothing is displayed.

In step S1614, the same organization tag is set at the start point of display of the organization tags.

In step S1616, the tags are hierarchically organized by tracing down child organization tags of the viewed user from the same organization tag.

In step S1618, the tags are displayed in detailed from the start point of display of the organization tags. In other words, the tags are displayed from same organization tag to the child organization tags. It is to be noted that the range of organization tags to be displayed may be the tags at all lower levels of the hierarchy, may be the tags in one hierarchy, may be the tags in two hierarchies, or may be determined according to a hierarchical instruction from the viewing user.

Figure 17:
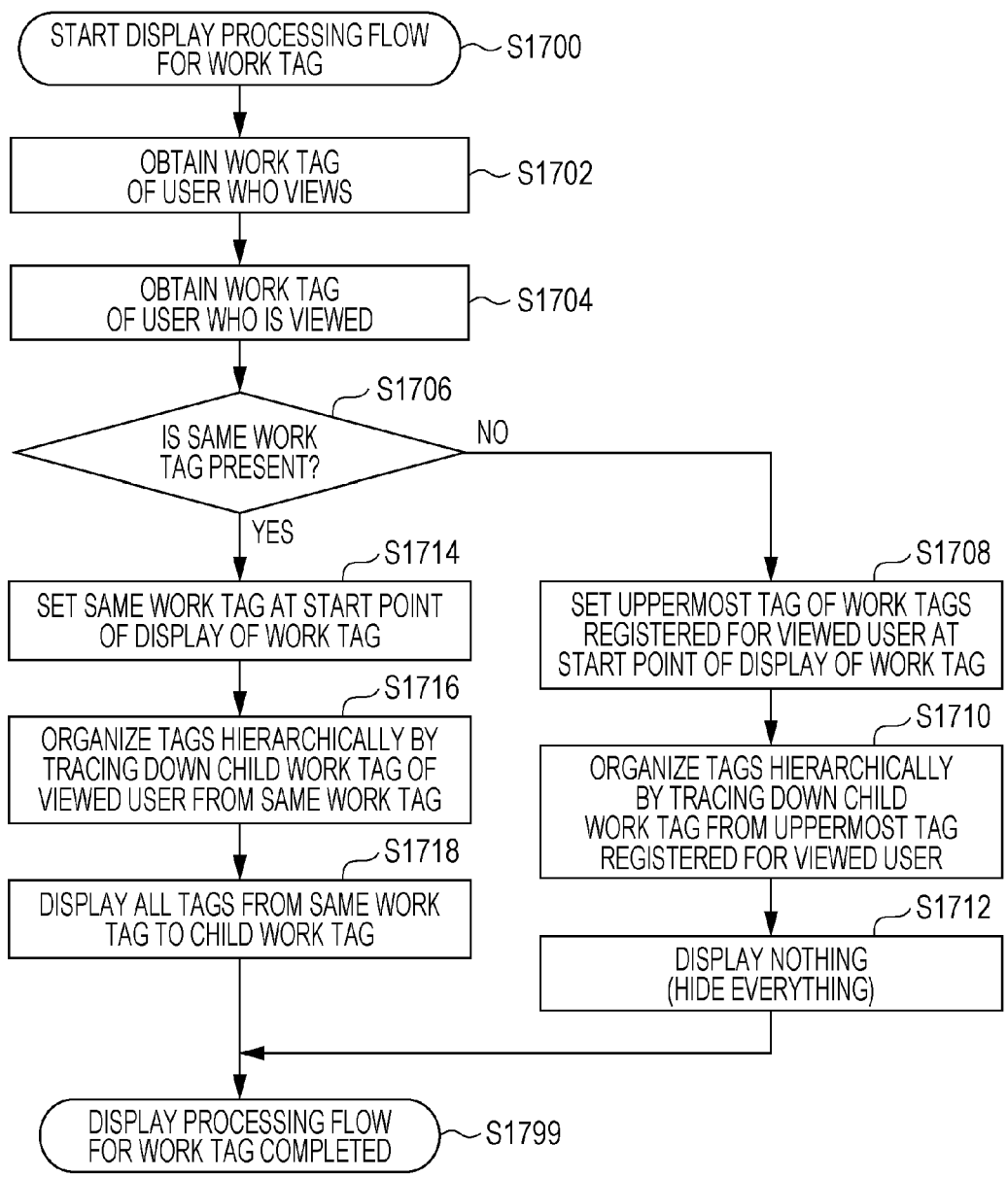
FIG. 17 is a flowchart illustrating a processing example according to this exemplary embodiment.

FIG. 17 is a flowchart illustrating a processing example according to this exemplary embodiment (tag display processing module 140). The flowchart illustrates a processing example of display processing for work tags.

In step S1700, display processing for work tags is started.

In step S1702, a work tag of a viewing user is obtained.

In step S1704, a work tag of a viewed user is obtained.

In step S1706, it is determined whether or not the same work tag is present, and when present, the flow proceeds to step S1714, otherwise the flow proceeds to step S1708.

In step S1708, each uppermost tag of the work tags registered for the viewed user is set at the start point of display of the work tags.

In step S1710, the tags are hierarchically organized by tracing down child work tags from each uppermost tag registered for the viewed user.

In step S1712, nothing is displayed (everything is hidden), and the display processing flow for work tags is completed (step S1799).

In step S1714, the same work tag is set at the start point of display of the work tags.

In step S1716, the tags are hierarchically organized tracing down child work tags of the viewed user from the same work tag.

In step S1718, all tags are displayed from the same work tag to the child work tags.

In step S1799, the display processing for work tags is completed.

Specifically, the processing as follows is performed.

In step S1702, a work tag of a viewing user is obtained.

In step S1704, a work tag of a viewed user is obtained.

In step S1606, when the same work tag is present between the viewing user and the viewed user (YES in step S1706), the same work tag is set at the start point of display of the work tags (step S1714). When the same work tag is not present (NO in step S1706), each uppermost tag of the work tags registered for the viewed user is set at the start point of display of the work tags (step S1708). It is to be noted that although organization has one start point, work may have multiple start points.

In step S1708, each uppermost tag of the work tags registered for the viewed user is set at the start point of display of the work tags.

In step S1710, the tags are hierarchically organized by tracing down child work tags from each uppermost tag registered for the viewed user.

In step S1712, nothing is displayed (everything is hidden). It is to be noted that tags at a higher level of the hierarchy (for instance, the uppermost (root), the second hierarchies) may be displayed rather than nothing is displayed.

In step S1714, the same work tag is set at the start point of display of the work tags.

In step S1716, the tags are hierarchically organized by tracing down child work tags of the viewed user from the same work tag.

In step S1718, the tags are displayed in detailed from the start point of display of the work tags. In other words, the tags are displayed from same work tag to the child work tags. It is to be noted that the range of work tags to be displayed may be the tags at all lower levels of the hierarchy, may be the tags in one hierarchy, may be the tags in two hierarchies, or may be determined according to a hierarchical instruction from the viewing user.

Figure 18:
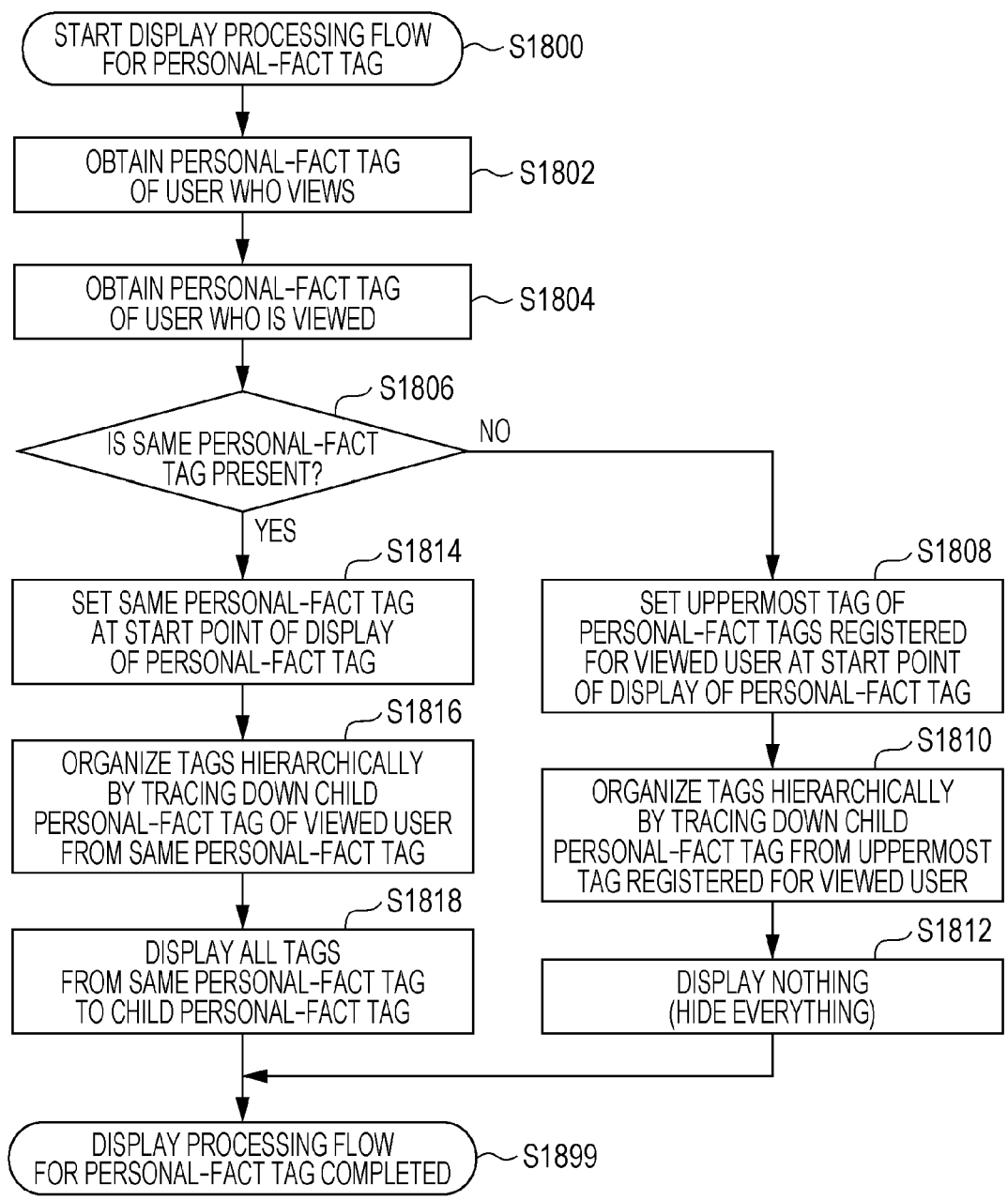
FIG. 18 is a flowchart illustrating a processing example according to this exemplary embodiment.

FIG. 18 is a flowchart illustrating a processing example according to this exemplary embodiment (tag display processing module 140). The flowchart illustrates a processing example of display processing for personal-fact tags.

In step S1800, display processing for personal-fact tags is started.

In step S1802, a personal-fact tag of a viewing user is obtained.

In step S1804, a personal-fact tag of a viewed user is obtained.

In step S1806, it is determined whether or not the same personal-fact tag is present, and when present, the flow proceeds to step S1814, otherwise the flow proceeds to step S1808.

In step S1808, the uppermost tag of the personal-fact tags registered for the viewed user is obtained.

In step S1810, the tags are hierarchically organized by tracing down child personal-fact tags from each uppermost tag registered for the viewed user.

In step S1812, nothing is displayed (everything is hidden), and the display processing flow for personal-fact tags is completed (step S1899). It is to be noted that tags at a higher level of the hierarchy (for instance, the uppermost (root), the second hierarchies) may be displayed rather than nothing is displayed.

In step S1814, the same personal-fact tag is set at the start point of display of the personal-fact tags.

In step S1816, the tags are hierarchically organized by tracing down child personal-fact tags of the viewed user from the same personal-fact tag.

In step S1818, all tags are displayed from the same personal-fact tag to the child personal-fact tags. It is to be noted that the range of personal-fact tags to be displayed may be the tags at all lower levels of the hierarchy, may be the tags in one hierarchy, may be the tags in two hierarchies, or may be determined according to a hierarchical instruction from the viewing user.

In step S1899, the display processing for personal-fact tags is completed.

Specifically, the processing as follows is performed.

In step S1802, a personal-fact tag of a viewing user is obtained.

In step S1804, a personal-fact tag of a viewed user is obtained.

In step S1806, when the same personal-fact tag present between the viewing user and the viewed user (YES in step S1806), the same personal-fact tag is set at the start point of display of the personal-fact tags (step S1814). When the same personal-fact tag is not present (NO in step S1806), each uppermost tag of the personal-fact tags registered for the viewed user is set at the start point of display of the personal-fact tags (step S1808). It is to be noted that although organization has one start point, personal-fact may have multiple start points.

In step S1808, each uppermost tag of the personal-fact tags registered for the viewed user is set at the start point of display of the personal-fact tags.

In step S1810, the tags are hierarchically organized by tracing down child personal-fact tags from each uppermost tag registered for the viewed user.

In step S1812, nothing is displayed (everything hidden). It is to be noted that tags at a higher level of the hierarchy (for instance, the uppermost (root), the second hierarchies) may be displayed rather than nothing is displayed.

In step S1814, the same personal-fact tag is set at the start point of display of the personal-fact tags.

In step S1816, the tags are hierarchically organized by tracing down child personal-fact tags of the viewed user from the same personal-fact tag.

In step S1818, the tags are displayed in detailed from the start point of display of the personal-fact tags. In other words, the tags are displayed from same personal-fact tag to the personal-fact work tags. It is to be noted that the range of personal-fact tags to be displayed may be the tags at all lower levels of the hierarchy, may be the tags in one hierarchy, may be the tags in two hierarchies, or may be determined according to a hierarchical instruction from the viewing user.

FIGS. 19A to 19B2 are explanatory diagrams illustrating a processing example according to this exemplary embodiment. The explanatory diagrams illustrate a presentation example of organization tags. FIGS. 19A to 19B2 illustrate an example of a profile display screen 1900 for "Fuji Taro". The profile display screen 1900 displays a tag display area 1910.

FIG. 19A illustrates a tag display area 1910A in the case of a viewing user A (a user not "Fuji Taro") who belongs to the organization "Tokyo metropolitan area sales department" of the company. The tag display area 1910A displays, for instance, "Tokyo metropolitan area sales department" as the organization tag, "group A" at its lower level of the hierarchy, and "major company service team" at a further lower level of the hierarchy. In other words, the viewing user and the viewed user have common tags up to "Tokyo metropolitan area sales department", and thus the division at a lower level of Tokyo metropolitan area sales department is displayed in detail. It is to be noted that nothing is displayed as a work tag, and nothing is also displayed as a personal-fact tag.

FIG. 19B1 illustrates an example of a profile display screen 1900B in the case of a viewing user B of an affiliated company. A tag display area 1910B displays nothing as the organization tag, and also displays nothing as the work tag, and the personal-fact tag. In short, since nothing is no common in the organization (because the companies are different), the tag display area 1910B displays tags in non-expanded form.

Here, when "organization" is clicked by the user B, illustrated the example of FIG. 19B2, the organization tag is expanded. The tag display area 1910B displays, for instance, "ABC corporation" as the organization tag, "sales department" at the next lower level of the hierarchy, "Tokyo metropolitan area sales department" at the next lower level, "group A" at the next lower level, and "major company service team" at the next lower level. In contrast to the case of the viewing user A illustrated in the example of FIG. 19A, the tags are displayed from the uppermost organization tag ("ABC corporation" in the example).

FIGS. 20A to 20B2 presents explanatory diagrams illustrating a processing example according to this exemplary embodiment. The explanatory diagrams illustrate a presentation example of work tags. FIGS. 20A to 20B2 illustrate an example of a profile display screen 2000 of "Yokohama Taro". The profile display screen 2000 displays a tag display area 2010.

FIG. 20A illustrates an example of a tag display area 2010A in the case of a viewing user C (a user not "Yokohama Taro") who is in charge of ABC system product line of the sales department. The tag display area 2010A displays, for instance, "ABC system" as the work tag, "authentication function" at the next lower level, "single sign-on" at the next lower level, "LDAP" at the next lower level, "AD" at the next lower level, "order function" at the next lower level of "ABC system", "DataBase" at the next lower level, "ABC system cooperative registration plug-in" at the next lower level of "ABC system", "authentication function" at the next lower level, and "registration function" at the next lower level of "ABC system cooperative registration plug-in". In short, since the user C and the viewed user are in charge of a common product line, the ABC system product line and functions of which each user is in charge are displayed in detail. It is to be noted that nothing is displayed as an organization tag, and nothing is also displayed as a personal-fact tag.

FIG. 20B1 illustrates an example of a profile display screen 2000B in the case of a viewing user D who is in charge of DEF system product line of the sales department. A tag display area 2010B displays nothing as the work tag, and also displays nothing as the organization tag, and the personal-fact tag. In short, since nothing is no common in the work, tag display area 2010B displays tags in non-expanded form.

Here, when "work" is clicked by the user D, as illustrated in the example of FIG. 20B2, the work tag is expanded. The tag display area 2010B displays, for instance, "software", "ABC system", "ABC system cooperative registration plug-in", "middleware", and "XYZ platform" as the work tags. In contrast to the case of the viewing user C illustrated in the example of FIG. 20A, each work tag at the uppermost level of the hierarchy is displayed.

Figure 21:
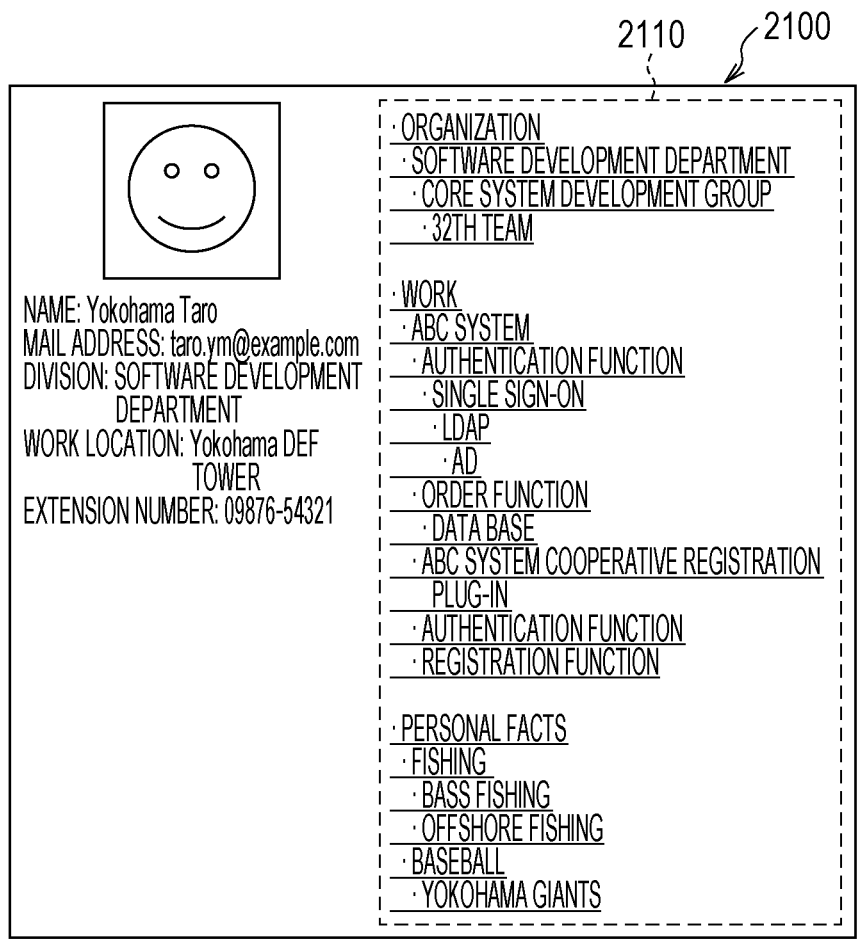
FIG. 21 is an explanatory diagram illustrating a processing example according to this exemplary embodiment.

FIG. 21 is an explanatory diagram illustrating a processing example according to this exemplary embodiment. The explanatory diagram illustrates a presentation example when a user E who views personal-fact tags has the user terminal (mobile terminal) 200D. FIG. 21 illustrates an example of a profile display screen 2100 for "Yokohama Taro". The profile display screen 2100 displays a tag display area 2110.

It is assumed that a user E in charge of sales and ABC system product line is going to have a project meeting with the user "Yokohama Taro" in a development department. In order to run the meeting smoothly, the user E recognizes the personality of the participating member from the profile, and tries to find a common subject to establish friendly relations toward the future.

The tags of the user E in charge of sales and the viewed user "Yokohama Taro", a member of the development department are categorized into organization, work, and personal-fact in advance and thus are hierarchized.

Figure 22:
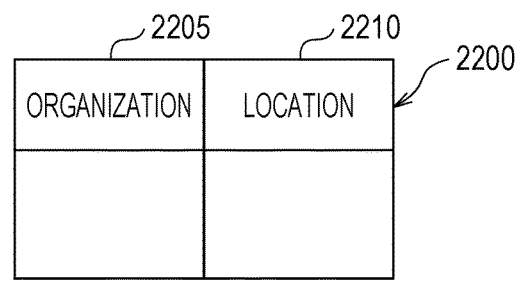
FIG. 22 is an explanatory table illustrating a data structure example of an organization and position table.

Although the user E in charge of sales and the viewed user have nothing in common in the organization, the meeting place is at the base site of the development department, and so the organization is also displayed in detail. Specifically, since the profile display screen 2100 is displayed by the user terminal (mobile terminal) 200D owned by the user E, an organization corresponding to the position (for instance, the latitude, the longitude) of the user terminal (mobile terminal) 200D is extracted from the organization and position table 2200. FIG. 22 is an explanatory table illustrating a data structure example of the organization and position table 200. The organization and position table 2200 has an organization column 2205 and a position column 2210. The organization column 2205 stores an organization. The position column 2210 stores the position (for instance, the latitude, the longitude) of the base site of the organization. As described above, the position of the user E is at the base site of the development department, and the viewed user also belongs to the development department, and thus the tags of the organization are displayed in detail. The tag display area 2110 displays, for instance, "software development department" as the organization tag, "core system development group" at the next lower level, and "32th team" at the next lower level.

Since a common product line in charge is present between the work tags, the common portion is displayed.

Similarly, since a common personal-fact (hobby) is present between the personal-fact tags, the common portion is displayed in detail. The tag display area 2110 displays, for instance, "fishing" as the personal-fact tag, "bass fishing" at the next lower level, "offshore fishing" at the next lower level of "fishing", "baseball", and "Yokohama Giants" at the next lower level.

Figure 23:
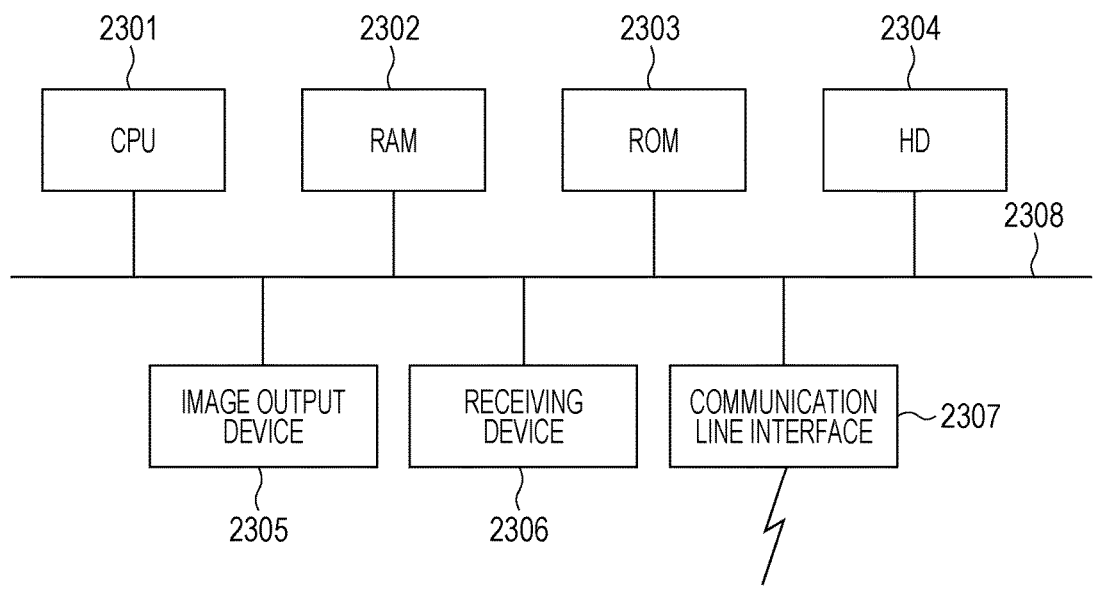
FIG. 23 is a block diagram illustrating a hardware configuration example of a computer that implements this exemplary embodiment.

It is to be noted that the hardware configuration of a computer that executes a program as the exemplary embodiment is a general computer as illustrated in FIG. 23, and specifically, a personal computer, or a computer that may function as a server. As specific examples, a CPU 2301 is used as a processing unit (calculation unit), and a RAM 2302, a ROM 2303, and a HD 2304 are used as storage devices. As the HD 2304, for instance, a hard disk or a solid state drive (SSD) may be used. The hardware configuration includes the CPU 2301 that executes a program such as the word extraction module 110, the user relation determination module 120, the category determination module 130, and the tag display processing module 140; the RAM 2302 that stores the program and data; the ROM 2303 that stores a program for starting-up the computer; the HD 2304 that is an auxiliary storage device (may be a flash memory) having functions of the document management module 150, the user management module 160, the group management module 170, the tag management module 180, and the class word management module 190; a receiving device 2306 that receives data according to a user operation on a keyboard, a mouse, a touch screen, a microphone and the like; an output device 2305 such as CRT, a liquid crystal display, and a speaker; a communication line interface 2307 for connecting to a communication network such as a network interface card; and a bus 2308 for connecting those components to exchange data. Multiple pieces of the computer may be connected via a network.

In an aspect of the above-described embodiment, implemented by a computer program, a computer program that is software is read by the system in this hardware configuration, and software and hardware resources are used cooperatively to implement the aspect of the above-described exemplary embodiment.

It is to be noted that the hardware configuration illustrated in FIG. 23 only presents one configuration example, and this exemplary embodiment is not limited to the configuration illustrated in FIG. 23, and may have a configuration that allows the modules described in this exemplary embodiment to be executed. For instance, part of the modules may be formed of dedicated hardware (for instance, an application specific integrated circuit (ASIC)), part of the modules may be in an external system and be connected via a communication line, or multiple systems, each of which is the system illustrated in FIG. 23, may be connected to each other via a communication line and may operate in a cooperative manner. In particular, the hardware configuration may be incorporated into a mobile information communication device including a mobile phone, a smartphone, a mobile device, and a wearable computer), an information appliance, a robot, a copier, a facsimile, a scanner, a printer, or a multifunctional device (an image processing device having at least two functions of a scanner, a printer, a copier, and a facsimile) in addition to a personal computer.

It is to be noted that the program described above may be stored in a recording medium and provided, or the program may be provided by a communication unit. In this case, for instance, the program described above may be regarded as an invention of a "computer-readable recording medium on which a program is recorded".

The "computer-readable recording medium on which a program is recorded" refers to a computer-readable recording medium on which a program is recorded that is used for installation, execution of programs and distribution of programs.

It is to be noted that the recording medium includes, for instance, "DVD-R, DVD-RW, DVD-RAM etc." which are digital versatile discs (DVD) and standards formulated by the DVD Forum, "DVD+R, DVD+RW etc." which are standards formulated by DVD+RW, compact discs (CD) such as a read-only memory (CD-ROM), a CD recordable (CD-R), and a CD rewritable (CD-RW), a Blu-ray (registered trademark) Disc, a magneto-optical disc (MO), a flexible disk (FD), a magnetic tape, a hard disk, read-only memory (ROM), an electrically erasable programmable read-only memory (EEPROM (registered trademark)), a flash memory, a random access memory (RAM), and a secure digital (SD) memory card.

All or part of the program may be recorded on the recording medium and may be saved and distributed. Also, all or part of the program may be transmitted by communication using a wired network or a wireless communication network used, for instance, for a local area network (LAN), a metropolitan area network (MAN), a wide area network (WAN), the Internet, Intranet, Extranet, or using a transmission medium in combination of those above, or may be transmitted on a carrier wave.

In addition, the program may be part or all of another program, or may be recorded on a recording medium along with a separate program. Alternatively, the program may be divided and recorded into multiple recording media. The program may be recorded in any manner such as compressed or encrypted from as long as the program can be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a central processing unit configured to:
in response to a first user selecting to view a profile of a second user, determining whether at least one tag of a first hierarchy of tags indicating characteristics of the first user with at least one tag of a second hierarchy of tags indicating characteristics of the second user is in common between the first user and the second user;
in response to determining that a tag is in common between the first user and the second user, displaying, on a display with information identifying the second user, the tag of the second user in common between the first user and the second user and details of the second hierarchy below the tag that is in common between the first user and the second user; and
in response to determining that a tag is not in common between the first user and the second user, displaying, on the display with the information identifying the second user, only a category of the characteristics of the second hierarchy without displaying any of the tags of the second hierarchy.

2. The information processing apparatus according to claim 1,
wherein the central processing unit is further configured to:
display details of the second hierarchy below the tag that is in common between the first user and the second user by also displaying a tag at a lower level of the second hierarchy than the tag in common.

3. The information processing apparatus according to claim 1,
wherein the at least one tag includes a plurality of tags classified into a plurality of types, and
whether or not a tag is common is determined by comparing tags belonging to a same classification.

4. The information processing apparatus according to claim 3,
wherein the classification includes at least an organization, and
as a tag of a user, an organization to which the user belongs is assigned to the user.

5. The information processing apparatus according to claim 3,
wherein the classification includes at least a job, and
as a tag of a user, a word extracted from a document related to the user is assigned to the user.

6. The information processing apparatus according to claim 3,
wherein the classification includes at least a personal fact, and
as a tag of a user, a word inputted by the user is assigned to the user.

7. The information processing apparatus according to claim 1, wherein the central processing unit is further configured to:
extract an organization corresponding to a position of the first user,
wherein when the organization extracted matches an organization to which the second user belongs, the central processing unit presents a tag of the organization in detail.

8. The information processing apparatus according to claim 7,
wherein the first user has a mobile terminal,
the central processing unit identifies a position of the first user from the mobile terminal, and
the central processing unit presents a tag to the mobile terminal.

9. A non-transitory computer readable medium storing a program causing a computer to function as a presentation unit that:
in response to a first user selecting to view a profile of a second user, determining whether at least one tag of a first hierarchy of tags indicating characteristics of the first user with at least one tag of a second hierarchy of tags indicating characteristics of the second user is in common between the first user and the second user;
in response to determining that a tag is in common between the first user and the second user, displaying, on a display with information identifying the second user, the tag of the second user in common between the first user and the second user and details of the second hierarchy below the tag that is in common between the first user and the second user; and
in response to determining that a tag is not in common between the first user and the second user, displaying, on the display with the information identifying the second user, only a category of the characteristics of the second hierarchy without displaying any of the tags of the second hierarchy.

* * * * *